US008271759B2

(12) United States Patent
Fujii et al.

(10) Patent No.: US 8,271,759 B2
(45) Date of Patent: Sep. 18, 2012

(54) STORAGE SYSTEM

(75) Inventors: Tetsuhiko Fujii, Odawara (JP);
Masataka Innan, Odawara (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1032 days.

(21) Appl. No.: 12/213,956

(22) Filed: Jun. 26, 2008

(65) Prior Publication Data
US 2009/0276594 A1    Nov. 5, 2009

(30) Foreign Application Priority Data
May 2, 2008    (JP) ................................. 2008-120563

(51) Int. Cl.
G06F 12/16    (2006.01)
(52) U.S. Cl. ......................... 711/170; 711/114; 711/162
(58) Field of Classification Search ........................ None
See application file for complete search history.

(56) References Cited

U.S. PATENT DOCUMENTS

| 7,734,712 | B1 * | 6/2010 | Meyer et al. ................. 709/213 |
| 2005/0144173 | A1 | 6/2005 | Yamamoto et al. |
| 2005/0198445 | A1 | 9/2005 | Fujimoto |
| 2006/0047863 | A1 | 3/2006 | Awakura |
| 2006/0101203 | A1 * | 5/2006 | Yanagisawa .................. 711/114 |
| 2006/0101220 | A1 * | 5/2006 | Cohn ............................ 711/170 |
| 2006/0242380 | A1 * | 10/2006 | Korgaonkar et al. ......... 711/170 |
| 2007/0050573 | A1 * | 3/2007 | Arakawa et al. .............. 711/162 |
| 2007/0101097 | A1 * | 5/2007 | Serizawa et al. .............. 711/203 |
| 2007/0136524 | A1 | 6/2007 | Murayama |
| 2007/0192561 | A1 | 8/2007 | Satoyama et al. |
| 2007/0220203 | A1 * | 9/2007 | Murase ......................... 711/114 |
| 2007/0245106 | A1 | 10/2007 | Maki et al. |
| 2008/0034005 | A1 * | 2/2008 | Satoyama et al. ............ 707/200 |
| 2008/0086585 | A1 * | 4/2008 | Fukuda et al. ................ 711/100 |

FOREIGN PATENT DOCUMENTS

| JP | 2003-280824 | 3/2002 |
| JP | 2005-165702 | 12/2003 |
| JP | 2007-213466 | 2/2006 |
| JP | 2006-72440 | 3/2006 |
| JP | 2007-157089 | 6/2007 |
| JP | 2007-286946 | 11/2007 |

* cited by examiner

Primary Examiner — Kaushikkumar Patel
(74) Attorney, Agent, or Firm — Stites & Harbison, PLLC; Juan Carlos A. Marquez, Esq

(57) ABSTRACT

Provided is a storage system comprising a plurality of storage subsystem in which each storage subsystem includes a storage resource and controls access from a host system to the storage resource of the storage subsystem. The storage system is capable of simply and promptly changing the operation of a storage subsystem between operating as a stand-alone system and virtualize the plurality of storage subsystems logically into one virtual storage subsystem and execute a first mode of causing a host system to recognize the virtual storage subsystem. The storage is further able to execute a second mode of causing the host system to recognize the plurality of storage subsystems respectively as separate storage subsystems.

5 Claims, 26 Drawing Sheets

FIG.11

| IDENTIFIER OF STORAGE SUBSYSTEM | SERVER CONNECTION PORT NUMBER | LOGICAL UNIT NUMBER ID | VOLUME ID |
|---|---|---|---|
| STORAGE SUBSYSTEM 1 | CL1-A | LUN=0 | 0001 |
| STORAGE SUBSYSTEM 1 | CL1-B | LUN=1 | 0002 |
| : | : | : | : |
| STORAGE SUBSYSTEM 2 | CL2-B | LUN=0 | 9000 |
| : | : | : | : |

FIG.12

| VOLUME ID | IDENTIFIER OF STORAGE SUBSYSTEM | ADDRESS INFORMATION OF HDD STORING DATA |
|---|---|---|
| 0001 | STORAGE SUBSYSTEM 1 | HDD#0-HDD#3 |
| 0002 | STORAGE SUBSYSTEM 2 | HDD#10-HDD#13 |
| : | : | : |

FIG.18

| BLOCK ADDRESS | HIT/MISS FLAG | IDENTIFIER OF STORAGE SUBSYSTEM STORING DATA | ADDRESS IN CACHE MEMORY OF STORAGE SUBSYSTEM STORING DATA |
|---|---|---|---|
| 0 | 0 (MISS) | - | - |
| ⋮ | ⋮ | ⋮ | ⋮ |
| 90 | 1 (HIT) | STORAGE SUBSYSTEM 1 | 170 |
| ⋮ | ⋮ | ⋮ | ⋮ |
| 200 | 1 (HIT) | STORAGE SUBSYSTEM 2 | 230 |
| ⋮ | ⋮ | ⋮ | ⋮ |

FIG.25

| UNUSED CAPACITY OF STORAGE SYSTEM 1 |
|---|
| UNUSED CAPACITY OF STORAGE SYSTEM 2 |
| ⋮ |
| UNUSED CAPACITY OF STORAGE SYSTEM n |

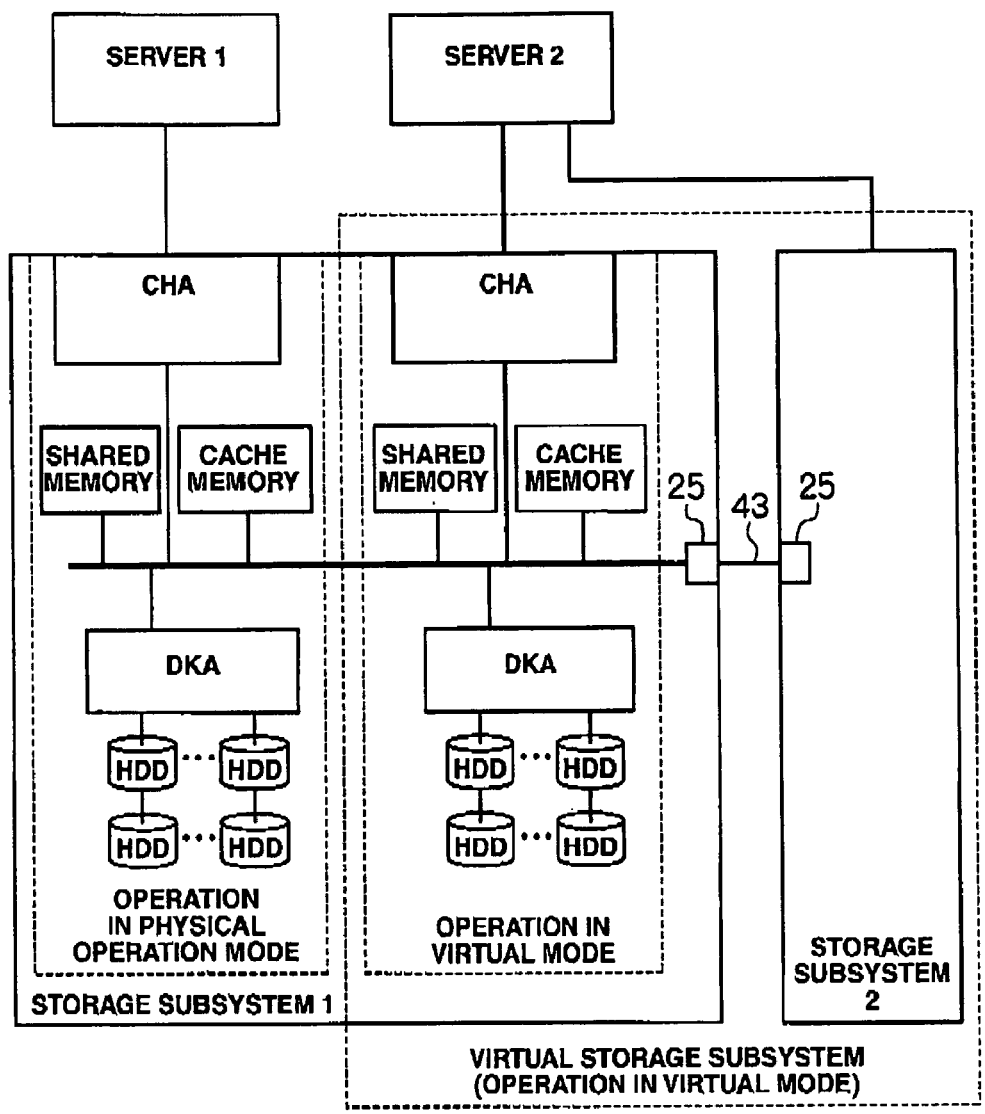

STORAGE SYSTEM

CROSS-REFERENCES

This application relates to and claims priority from Japanese Patent Application No. 2008-120563, filed on May 2, 2008, the entire disclosure of which is incorporated herein by reference.

BACKGROUND

The present invention generally relates to a storage system, and in particular relates to a virtual storage system.

Known is a virtual storage system that connects a plurality of storage subsystems and causes the host computer to recognize such plurality of storage systems logically as one storage subsystem. According to this virtual storage system, there is an advantage in that a user is able to integrate and manage a plurality of storage subsystems, and operate such plurality of storage subsystems as a single storage subsystem. This virtual storage system is also referred to as a grid storage system.

A virtual storage system is described in Japanese Patent Laid-Open Publication No. 2003-280824, Japanese Patent Laid-Open Publication No. 2005-165702, and Japanese Patent Laid-Open Publication No. 2007-213466, respectively.

SUMMARY

Although the foregoing conventional technologies describe that a storage subsystem operated as a stand-alone system can be operated as a virtual storage system, there is no disclosure concerning the change of a storage subsystem operated as a virtual storage system to a stand-alone system. In fact, in order to make the foregoing change of operation, it is necessary to modify the setting of a plurality of storage subsystems, and it was difficult to change the operation simply and promptly.

Thus, an object of the present invention is to provide a storage system capable of simply and promptly changing the operation of a storage subsystem as a stand-alone system and the operation of a storage subsystem as a virtual storage system.

In order to achieve the foregoing object, this storage system is able to set a first mode that operates as a stand-alone system and a second mode that operates as a virtual storage system from a management apparatus to each of the multiple storage subsystems.

According to the present invention, it is possible to provide a storage system capable of simply and promptly changing the operation of a storage subsystem as a stand-alone system and the operation of a storage subsystem as a virtual storage system.

DESCRIPTION OF DRAWINGS

FIG. 11 is a management table prescribing path definition information of the virtual storage system;

FIG. 12 is a volume management table;

FIG. 18 is a hit/miss determination table;

FIG. 25 is a table for managing the capacity of a pool volume of the respective storage subsystems belonging to the virtual storage system;

FIG. 32 is a block diagram of the storage system showing a case of partitioning the resources of the storage subsystem into a physical operation mode and a virtualization mode where a plurality of modes coexist.

DETAILED DESCRIPTION

Figure 1:
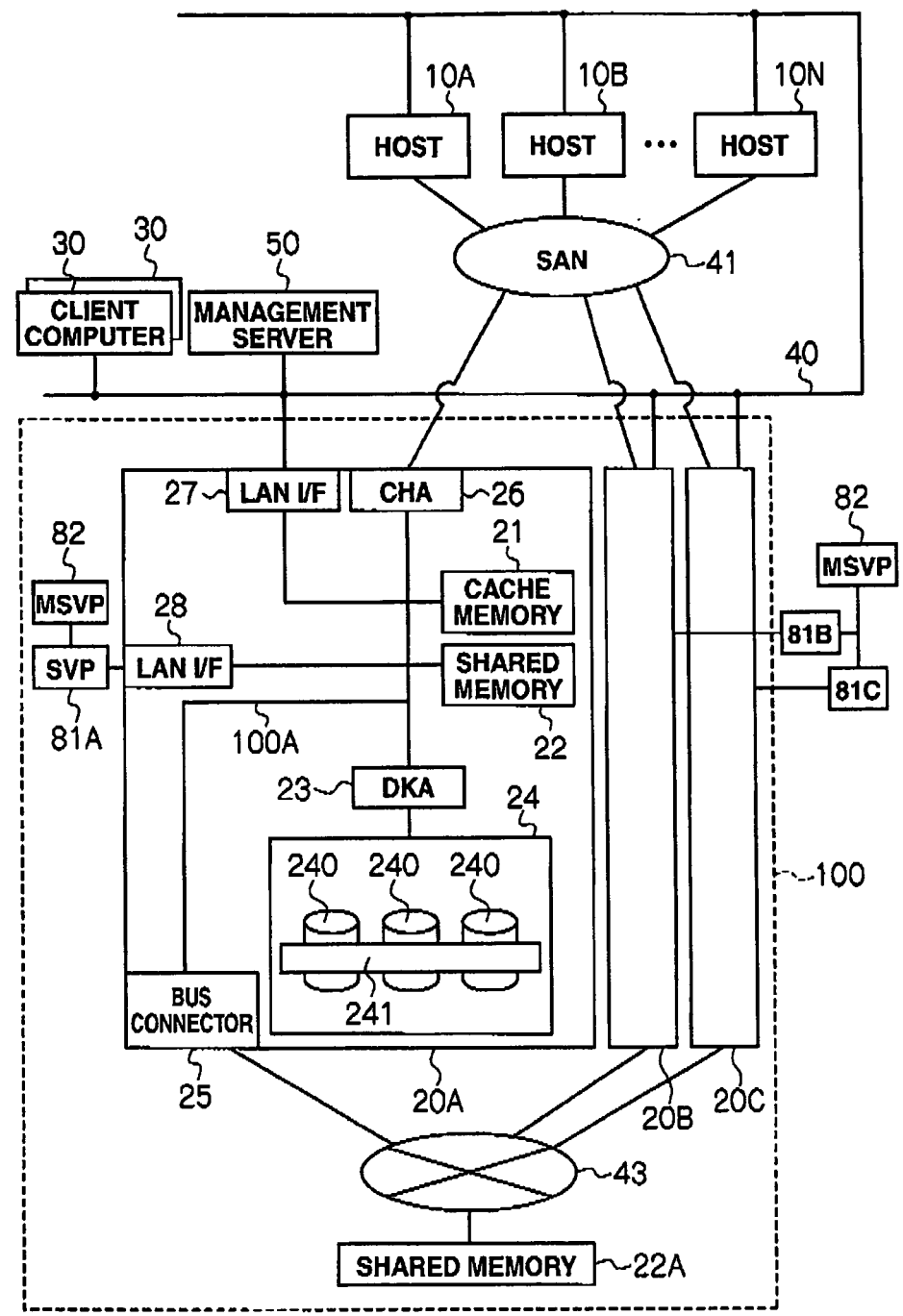
FIG. 1 is a hardware block diagram of an embodiment of a virtual storage system according to the present invention.

The virtual storage system according to an embodiment of the present invention is now explained with reference to the attached drawings. FIG. 1 shows a system configuration block diagram of a virtual storage system 100. The virtual storage system 100 comprises a plurality of storage [sub] systems 20A, 20B, 20C.

At least one of a plurality of host computers 10A, 10B, . . . , 10N is connected to the storage subsystems 20A, 20B, 20C. If it is not necessary to individually differentiate these host computers, they will be collectively referred to as the host computer 10.

The host computer 10 is connected to the storage subsystems 20A, 20B, 20C via a SAN (Storage Area Network) 41. If a plurality of storage subsystems are mutually connected to function logically as a single storage subsystem to the host computer, the host computer 10 recognizes the plurality of storage [sub]systems 20A, 20B, 20C logically as one storage resource.

Meanwhile, if a storage subsystem functions not as a part of the virtual storage system but as a stand-alone system to the host computer, the host computer 10 recognizes each of the plurality of storage subsystems distinctly.

How the host computer recognizes a plurality of storage subsystems depends on the settings configured in the storage subsystem. This will be explained in detail later.

The host computer is a host system of the storage subsystem and, for example, is a computer device comprising information processing resources such as a CPU (Central Processing Unit) and a memory, and configured from a personal computer, a workstation, a server, a mainframe or the like.

The host computer comprises an information input device such as a keyboard switch, a pointing device or a microphone, and an information output device such as a monitor display or a speaker.

The host computer 10 includes an application program (business program) such as database management software, Web application software, streaming application software, and E-business application software.

The storage subsystems 20A, 20B, 20C configuring the virtual storage system 100 respective comprise a channel adapter (CHA) 26, a shared memory 22, a cache memory 21, a disk adapter (DKA) 23, a disk unit 24 such as an HDD, a bus connector 25 to a bus 100A, and LAN (Local Area Network) interface controllers 27, 28. The respective system components are mutually connected via an internal bus 100A.

Figure 2:
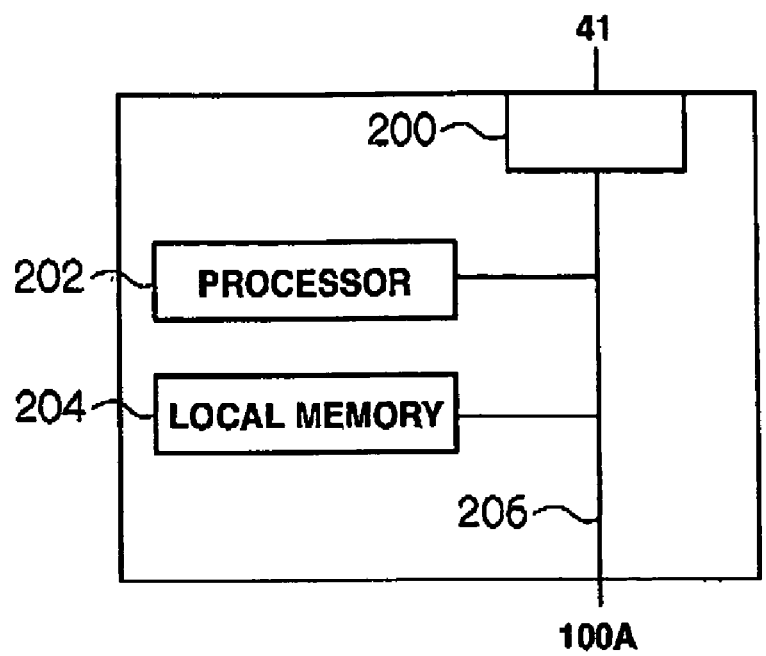
FIG. 2 is a block diagram showing the hardware of a channel adapter.

The CHA 26, as shown in FIG. 2, is configured by a port 200 to be connected to the SAN 41, a microprocessor 202, and a local memory 204 being mutually connected via a bus 206.

Figure 3:
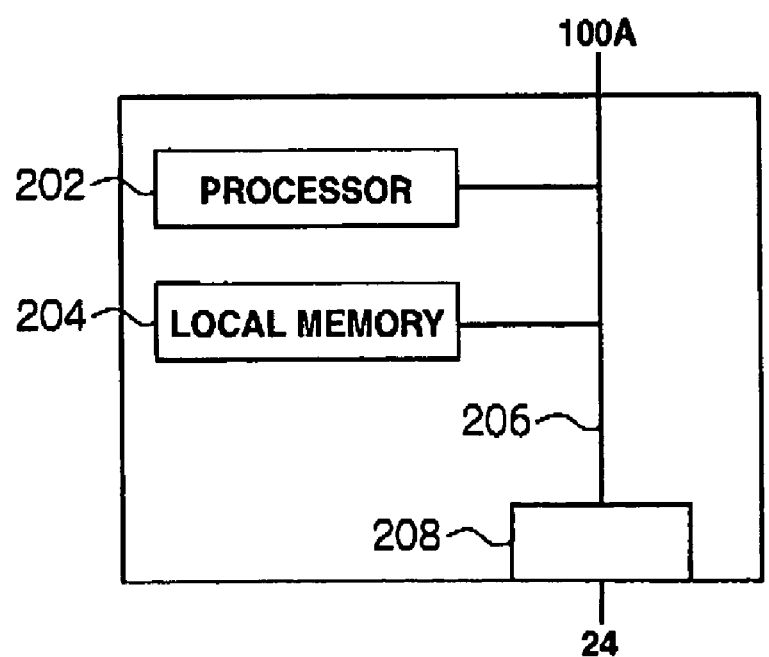
FIG. 3 is a block diagram showing the hardware of a disk adapter.

The DKA also, as shown in FIG. 3, is configured by a port 208 to be connected to the disk unit 24, a microprocessor 202, and a local memory 204 being mutually connected via a bus 206. The port 208 of the DKA and the disk unit 24 are connected with a fibre channel FC-AL or fabric, a parallel SCSI or the like.

The CHA 26 controls the transfer of commands and data to and from the host computer 10 via the SAN 41 located between the CHA 26 and the host computer 10. The data communication protocol via the SAN 41 is a fibre channel protocol, an iSCSI protocol or the like.

The microprocessor 202 (FIG. 2) of the CHA 26 receives commands requesting the reading and writing of data together with the data from the host computer 10, and interprets and executes the various commands. The microprocessor 202 (FIG. 3) of the DKA 23 executes programs for controlling a plurality of HDDs. These programs are stored in the local memory 204 that constitutes a pair with the microprocessor.

Control information required for performing cooperative processing between the CHA 26 and the DKA 23 is stored in the shared memory 22. The microprocessors of the CHA and the DKA are able to access the control information of the shared memory 22 via the bus 100A.

When the CHA 26 receives a data read request from the host computer 10, it stores the read command in the shared memory 22. The DKA 23 occasionally refers to the shared memory 22 and, upon discovering an unprocessed read command, reads data from the HDD as a storage device, and stores such data in the cache memory 21.

The cache memory 21 is used for temporarily storing data to be sent and received between the host computer 10 and the storage subsystem 20.

The CHA 26 reads the data transferred to the cache memory 21, and sends it to the host computer 10 of the command source. When the CHA 26 receives a data write request from the host computer, it stores the write command in the shared memory 22, and records the received data in the cache memory 21.

The DKA 23 records data stored in the cache memory 21 on a prescribed HDD according to a command from the shared memory 22. When the DKA 23 input and outputs data to and from the HDD, it converts the LBA (Logical Block Address) as the logical address output from the CHA 26 into a physical address.

The DKA 23 performs data access according to the RAID configuration of the disk unit 24. The disk unit 24 includes a plurality of disk drives 240 configured in RAID (Redundant Arrays of Independent Inexpensive Disks) format.

The disk drive 240 is a physical device such as an FC (Fibre Channel) disk drive, a SATA (Serial Advanced Technology Attachment) disk drive, a PATA (Parallel Advanced Technology Attachment) disk drive, a FATA (Fibre Attached Technology Adapted) disk drive, a SAS (Serial Attached SCSI) disk drive or a SCSI (Small Computer System Interface) disk drive. A physical device is a real device having a real storage area.

The DKA 23 is able to control the plurality of disk drives 240 in a RAID level (for instance level 0, 1 or 5) defined in the RAID format. In the RAID format, the plurality of disk drives 240 are managed as a single RAID group.

A RAID group is configured by grouping four disk drives 240 as one group (3D+1P), or grouping eight disk drives 240 as one group.

In other words, the storage areas provided by each of the plurality of disk drives 240 are gathered to configure one RAID group. A plurality of logical volumes 241 as an access unit from the host computer 10 are defined in the RAID group.

One or more logical volumes (LDEV) 241 are mapped to the logical unit as a logical storage area recognized by the host computer 10. The host computer 10 is able to access the logical volume 241 by designating the LUN (logical number) and the LBA.

If the host computer 10 is a Unix® system, the logical unit is associated with a device file. If the host computer 51 is a Windows® system, the logical unit as associated with a drive letter (drive name). A LUN (Logical Unit Number) is assigned to the logical unit.

Commands sent from the host computer 10 to the CHA 26 of the storage subsystem 20 (20A, 20B, 20C) are written into the shared memory 22 by the microprocessor of the CHA. The CHA executes processing corresponding to the command, and writes the execution result as the status in the shared memory 22.

The bus connector 25 of the bus 100A is connected to a network 43 that mutually connects the plurality of storage subsystems 20A, 20B, 20C. The plurality of storage subsystems exchange commands, control information and data via the network 43.

The LAN interface controller 27 is connected to the management server 50 via the management network 40. The management network 40 is a LAN configured from the Ethernet® cable or the like.

The data communication protocol in the management network 40 is TCP/IP. The management server 50 manages the creation of a logical unit, allocation of the logical unit to the host computer 10, setting (LUN masking or zoning) of the access path between the host computer 10 and the storage subsystem 20.

A service processor 81A is connected to the storage subsystem 20A. The service processor 81A is a computer terminal for setting the configuration information and acquiring the operation information of the storage subsystem 20A.

The service processor 81A is connected to the LAN interface controller 28 in the storage subsystem 20A. A service processor 81B is similarly connected to the storage subsystem 20B, and a service processor 81C is similarly connected to the storage subsystem 20C.

The respective service processors 81 connected to the respective storage subsystems are connected to one master service processor 82. The master service processor 82 consolidates the information (configuration information, volume structure, and operation information of the storage subsystem 20) collected from the respective service processors 81.

Incidentally, one service processor among the plurality of service processors 81 may function as the master service processor, or the respective storage systems 20 may be directly connected to the master service processor 82.

As a result of the plurality of storage subsystems 20A, 20B, 20C configuring the storage system 100 mutually sending and receiving configuration information, they are able to transfer commands and migrate data between the storage subsystems.

A plurality of host computers 10 and a plurality of client computers 30 are connected to the management network 40. Each client computer 30 is connected to the host computer via the management network 40, and requests the input and output of data to the storage system 100 via the application program of the host computer.

If the host computer 10 is connected to the CHA 26 via the LAN, the host computer designates a file name and requests the input and output of data to the storage subsystem in file units.

Meanwhile, if the host computer is connected to the CHA 26 via the SAN, the host computer requests the input and output of data to the storage subsystem in block units, which are data management units of the storage area provided by a plurality of disk storage devices (disk drives) according to a fibre channel protocol.

If the communication means is a LAN, the adapter of the host computer is a LAN-compatible network card or the like. If the communication means is a SAN, the adapter of the host computer is the foregoing HBA. Here, the host computer and the storage subsystem transfer data according to the fibre channel protocol.

If the host computer is a mainframe, data transfer is performed according to a communication protocol such as FICON (Fibre Connection®), ESCON (Enterprise System Connection®), ACONARC (Advanced Connection Architecture®), or FIBARC (Fibre Connection Architecture®).

Figure 4:
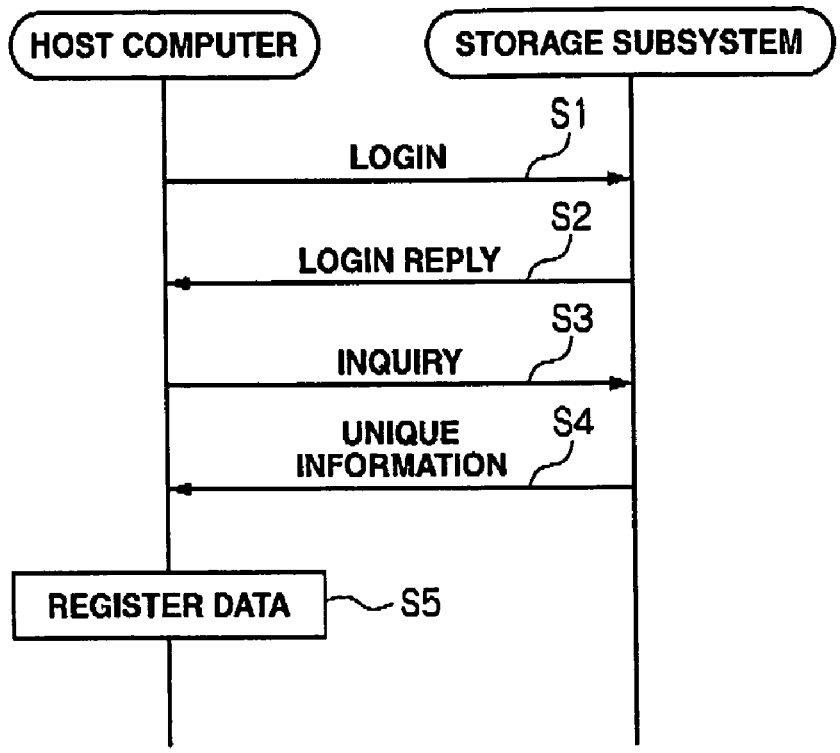
FIG. 4 is a timing chart explaining a reply from a storage subsystem to an inquiry command from a host computer.

When the host computer is connected to the storage subsystem, it performs recognition processing based on a reply from the storage subsystem. FIG. 4 is a timing chart showing the processing contents thereof.

Foremost, each of the plurality of host computers 10 logs into the CHA of each of the plurality of storage subsystems 10 (S1).

The login is complete when the storage subsystem 20 logs into the host computer 10 and returns a login reply S2.

Subsequently, the host computer sends an inquiry command (Inquiry) defined in the SCSI (Small Computer System Interface) standard to the storage subsystem, and seeks a reply of the system information (profile) from the storage subsystem (S3).

An inquiry command is used for clarifying the type and configuration of the inquired storage subsystem, and it is thereby possible to penetrate the hierarchy of the inquired system and comprehend the physical structure.

By using the inquiry command, the host computer acquires system information configured from at least one among the manufacturer name (vendor ID), model name (product ID), apparatus number (unit serial number), and version information of the micro program (firmware) of the CHA from the storage subsystem to which the host computer has logged in (S4). The foregoing information is stored in a prescribed area of the host computer (S5).

To which controller the ports of the storage controller connected to the server belong is identified from the reply values configured from the vendor ID, product ID, and unit serial number to the Inquiry command. If the reply values from the respective ports are the same, the server recognizes the ports to be of the same storage controller. If the reply values are different, the server recognizes the ports to belong to different storage controllers.

Depending on the operating system of the server, there may be cases where the difference in controllers is determined, using other reply values or reply values to other commands. But in this case also, if the replies to the command are made to be the same in a plurality of controllers, the server will not be able to differentiate the ports.

If the storage subsystem 20 operates as a standalone system, all storage subsystems respectively supply unique system information from the SAN 41 to the host computer 10 connected to the port of the CHA via the port of the CHA.

Meanwhile, if the storage subsystem 20 operates as a virtual system, the respective storage subsystems supply the same system information to the host computer. This same system information is virtual or simulated information to be set separately from the unique system information of the storage subsystem, and is hereafter referred to as "virtual information."

The control information regarding whether the storage subsystem operates as a stand-alone system or as a virtual storage system is set by the master management apparatus 82 in the shared memory 22 of the respective storage subsystems.

Figure 5:
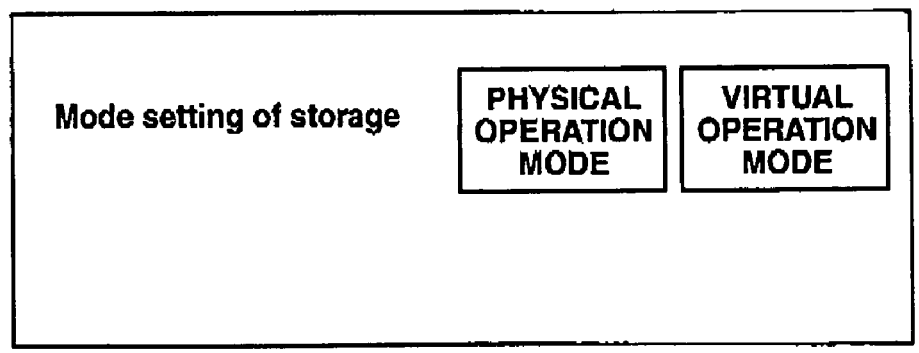
FIG. 5 is a management screen to be used by a user administrator upon setting the operation mode of the storage subsystem with an integrated management apparatus (master management terminal)

FIG. 5 is a user management screen of the master management apparatus 82. The user administrator sets the operation mode of the storage subsystem based on this management screen. When the user selects the physical operation mode, the master management apparatus sets a flag corresponding to the physical operation mode to the operation mode flag of the shared memory 22 of all storage subsystems. When the user selects the virtual operation mode, the master management apparatus sets a flag corresponding to the virtual operation mode to the operation mode flag of the shared memory of all storage subsystems.

The physical operation mode is control information that operates the storage subsystem as a stand-alone system, and the virtualization mode is control information that operates the storage subsystem as a virtual system.

Figure 6:
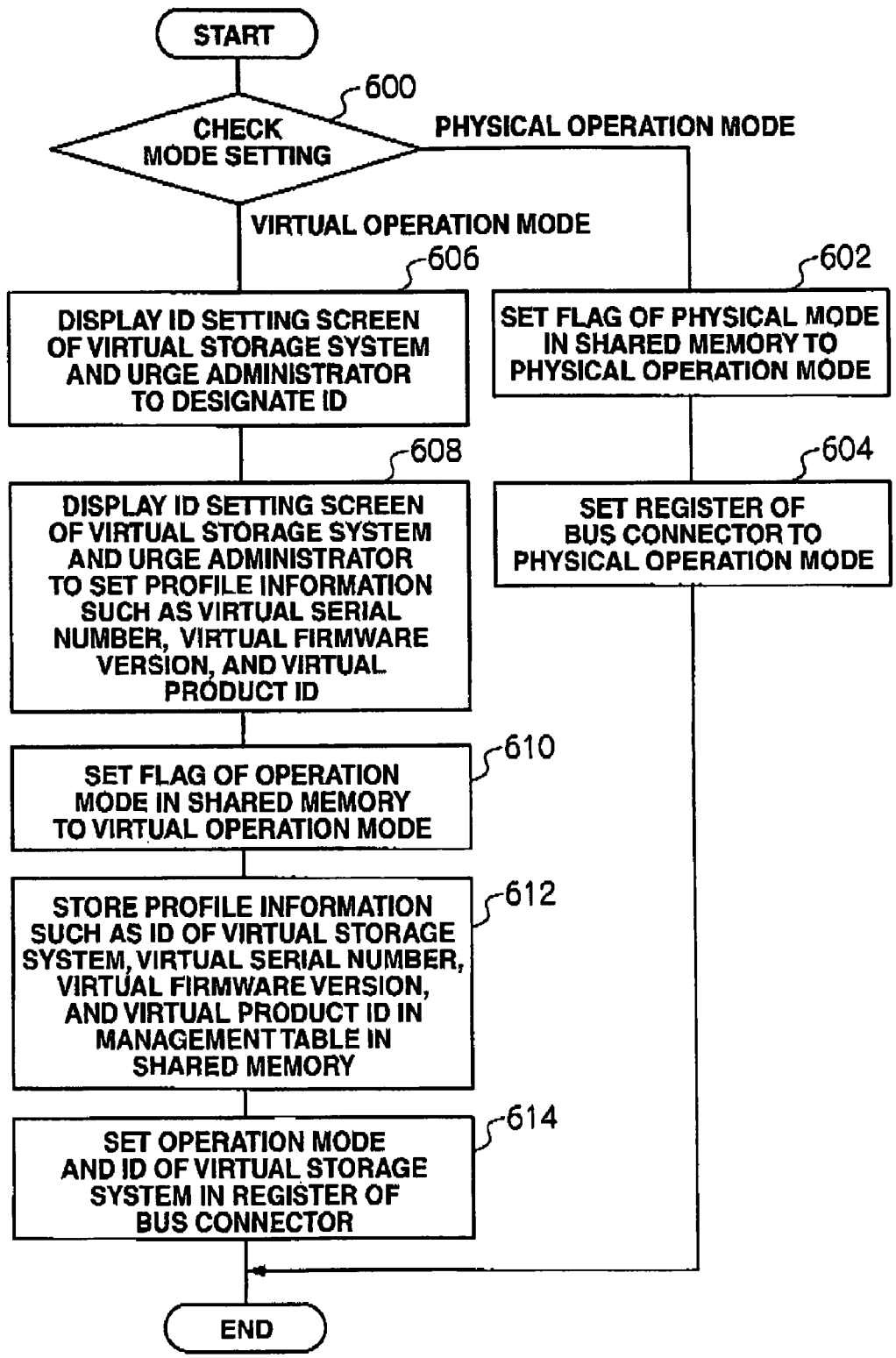
FIG. 6 is a flowchart showing the processing operation of the integrated management apparatus upon the integrated management apparatus setting the operation mode to the storage subsystem.

FIG. 6 is a flowchart for the master management apparatus 82 to set the operation mode in the storage subsystem 20. The setting program of the master management apparatus provides the management screen of FIG. 5 to the user administrator, and thereafter checks the operation mode input from the user administrator (600).

When the user administrator selects the physical operation mode, the master management apparatus sets a flag corresponding to the physical operation mode in the shared memory 22 of the storage subsystem (602).

Subsequently, the master management apparatus sets a flag corresponding to the physical operation mode in the register of the bus connector 25 (604).

Figure 7:
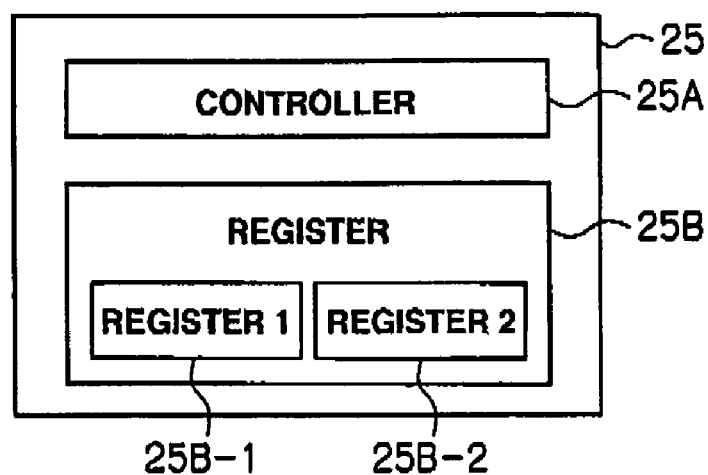
FIG. 7 is a block diagram showing the hardware of a connector of the storage subsystem.

The bus connector 25, as shown in FIG. 7, comprises a controller 25A and a register 25B. The register 25B records control information for defining the connection relationship between the bus 100A and the network 43 in the storage subsystem, and the controller 25A connects or disconnects the bus 100A and the network 43 based on the control information of the register 25B.

The register comprises a register 1 (25B-1) and a register 2 (25B-2), and the register 1 is a storage area of the flag corresponding to the physical operation mode. If the register 1 is set to "1," the controller 25A enables the connection between the bus 100A and the network 43. Contrarily, if the register 1 is set to "0," the controller disables the connection. At step 604, the master management apparatus 82 sets the register 1 to "0."

The register 2 is an area for registering the ID of the virtual storage system (hereinafter referred to as the "virtualization ID"). Although this will be explained in detail later, the register 2 is set to NULL in the physical operation mode.

Figure 8:
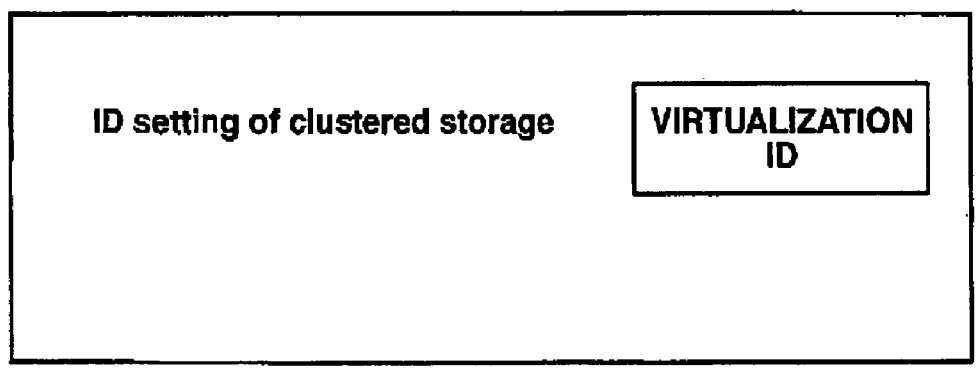
FIG. 8 is a management screen of the integrated management apparatus for setting the same virtualization ID to a plurality of storage subsystems belonging to a virtual storage system.

At step 600, if the master management apparatus 82 confirms that the virtual operation mode has been selected, it outputs a screen for setting the virtualization ID of FIG. 8 to the management screen, and requests the user administrator to input the virtualization ID (606).

By separating a plurality of storage subsystems into a plurality of groups and assigning a different virtualization ID to the respective groups, a plurality of virtual storage systems can be created in relation to the host computer.

Figure 9:
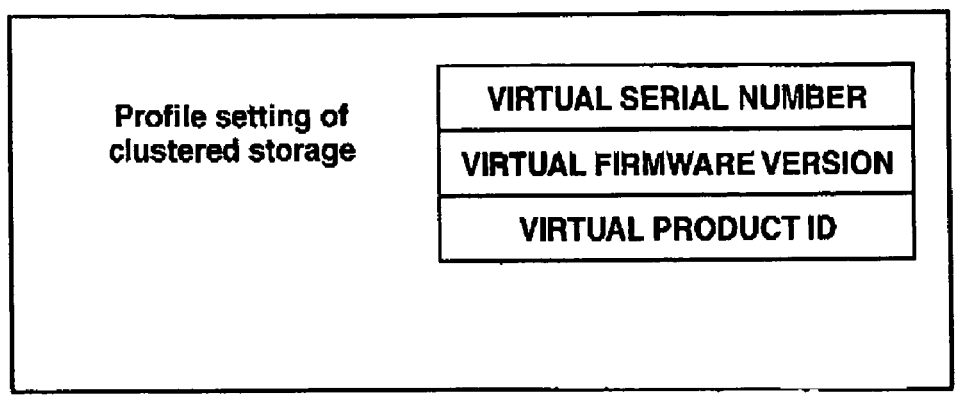
FIG. 9 is a management screen of the integrated management apparatus for setting the same virtualization information to a plurality of storage subsystems belonging to a virtual storage system.

Subsequently, the master management apparatus presents to the user administrator a screen for inputting virtual information to the virtual storage system input with the virtualization ID as shown in FIG. 9, and urges the user administrator to input the virtual information (608).

The term "virtual" of virtual information means that it is different from the unique system information originally retained in the storage subsystem. From this respective, virtual information may also be referred to as simulated information.

The virtual information is configured from a virtual serial number, a virtual firmware version, and a virtual apparatus number imitating the foregoing system information. The serial number, the firmware version information, and the apparatus number are profile information of the controller of the storage subsystem.

Subsequently, the master management apparatus stores the virtualization ID and the virtual information in the shared memory 22 of (one or more) storage subsystems 1 set with the same virtualization ID (610, 612).

Figure 10:
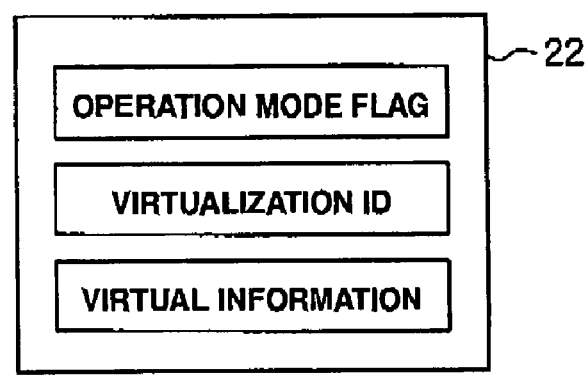
FIG. 10 is a block diagram showing the structure of a shared memory.

FIG. 10 is a block diagram of the structure for recording information input from the user management screen in the shared memory 22. The shared memory comprises an area for recording a flag corresponding to the operation mode, an area for recording a virtualization ID, and an area for recording virtual information. The CHA 26 that received a command from the master management apparatus 82 or the master management apparatus registers the virtual information and the like in the management table stored in the shared memory.

Further, the master management apparatus 82 sets "1" to the register 1 (FIG. 7) of the bus connector, and registers the virtualization ID in the register 2 (614).

The master management apparatus is connected to the respective management apparatuses of the plurality of storage subsystems. The master management apparatus executes the flowchart of FIG. 6 to the plurality of storage subsystems to be set as a virtual storage system.

When adding a certain storage subsystem connected to the SAN 41 to an existing virtual storage system, the master management apparatus 28 executes the flowchart of FIG. 6, sets the operation mode of this storage subsystem to a virtual operation mode, sets the same virtualization ID and virtual information as the virtual storage subsystem to the storage subsystem, and sets a flag to the register of the path connector as per step 614 of FIG. 6.

Meanwhile, if a certain storage subsystem configuring the virtual storage system is to be removed from the virtual storage system and operated as a stand-alone system, the operation mode is changed from the virtual operation mode to the physical operation mode, sets "0" to the flag 1 of the path connector, and the virtualization ID of the flag 2 is set to NULL.

As shown in FIG. 6, when the storage subsystem receives an Inquiry command from the host computer in the processing of S4 of FIG. 4, the CHA 26 checks the flag of the shared memory 22 (600) and, if the flag is in a physical operation mode, the CHA 26 replies the storage subsystem unique system information from the shared memory 22 to the host computer (604).

If the flag is a virtual operation mode, the CHA 26 replies the virtualization ID and the virtual information to the host computer.

When the host computer 10 receives command or unified information such as the same virtualization ID and virtual information from the respective CHAs 26 of the plurality of storage subsystems 20, the host computer 10 recognizes the plurality of storage subsystems 20 logically as one storage subsystem; that is, as the virtual storage system. The host computer 10 recognizes the CHA of different storage subsystems logically as different ports of one storage subsystem.

When a plurality of storage subsystems are to be combined or integrated to configure a virtual storage system, it is necessary to uniquely define the port to which the host computer is to be connected, a logical unit and a logical volume to be mapped to the logical unit of each of the plurality of storage subsystems in the logical system of the virtual storage system.

FIG. 11 is a management table prescribing the path definition information of the virtual storage system. The respective storage subsystems of the virtual storage system are differentiated with an identifier. The virtual storage system 1 has two ports CL1-A and CL1-B connected to the host computer, and FIG. 11 shows that a logical unit LUN 0 is allocated to the CL1-A, a logical unit LUN 1 is allocated to the CL1-B, a logical unit LUN 1 is allocated to the logical volume 0001, and a logical unit LUN 1 is allocated to the logical volume 0002.

The port number, the logical unit ID, and the logical volume ID are uniquely defined across all storage subsystems belonging to the virtual storage system.

FIG. 12 is a volume management table and, for instance, shows that the data of the logical volume 0001 of the storage subsystem 1 is stored in the HDD #0 and the HDD #3 of the disk device.

The management tables shown in FIG. 11 and FIG. 12 are respectively stored from the master management apparatus 82 in the shared memory 22 of all storage subsystems set with the same virtualization ID.

Figure 13:
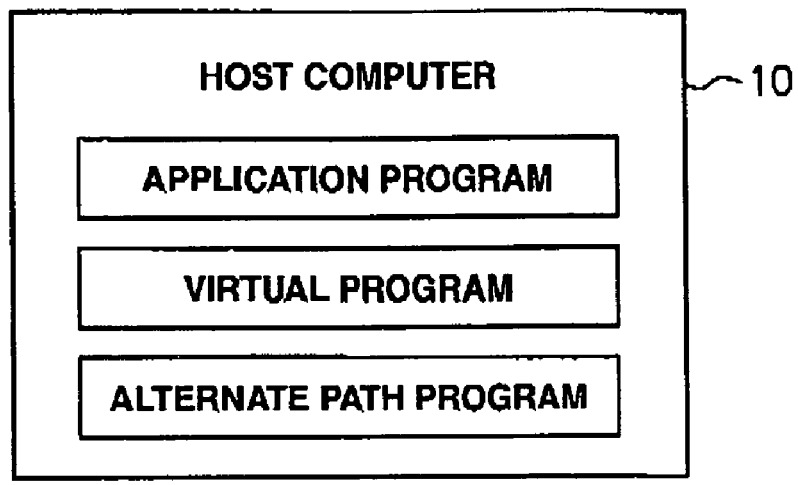
FIG. 13 is a block diagram of the host computer.

As shown in FIG. 13, the host computer 10 comprises the foregoing application program, a virtualization program and an alternate path program. The host computer accesses the CHA by recognizing the plurality of storage subsystems set with the same virtualization ID and same virtual information logically as one storage subsystem or logically as one storage resource based on the virtualization program.

The alternate path program manages the logical paths between the host computer and the logical volume in the virtual storage system, and executes multi path control. Multi path control is the control of determining which logical path among the plurality of logical paths is to be used for accessing the logical volume.

The storage subsystem comprises individual management tables defined according to the system of the stand-alone system in addition to the foregoing management table managed according to the system of the virtual storage system.

As shown in the flowchart of FIG. 6, the CHA 26 that received access from the host computer refers to the shared memory 22 and checks the operation flag. When the CHA confirms that the operation flag is a virtual operation mode, it refers to the management table that is uniformly managed and operated according to the system of the virtual storage system, and processes commands from the host computer.

When the CHA confirms that the operation flag is a physical operation mode, it refers to the management table managed according to the system of the stand-alone system.

As described above, the respective storage subsystems of the virtual storage system process the access from the host computer according the foregoing management table defined according to the system of the virtual storage system.

Figure 14:
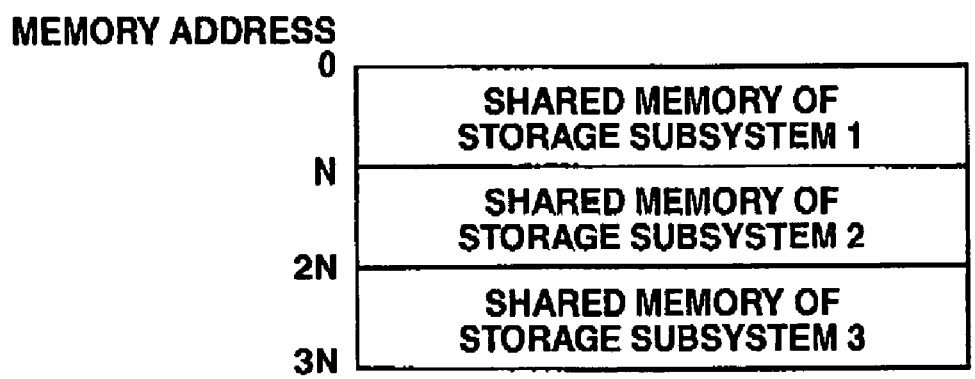
FIG. 14 is a block diagram showing the structure of the memory address in the shared memory of the storage subsystem belonging to the virtual storage system.

The CHA and the DKA of a certain storage subsystem belonging to the virtual storage system refer to the shared memory of the other storage subsystem via the bus connecting wire. Therefore, the address of the shared memory viewed from the CHA and the DKA of a certain storage subsystem is configured as shown in FIG. 14 for referring to the shared memory of another storage subsystem.

Figure 15:
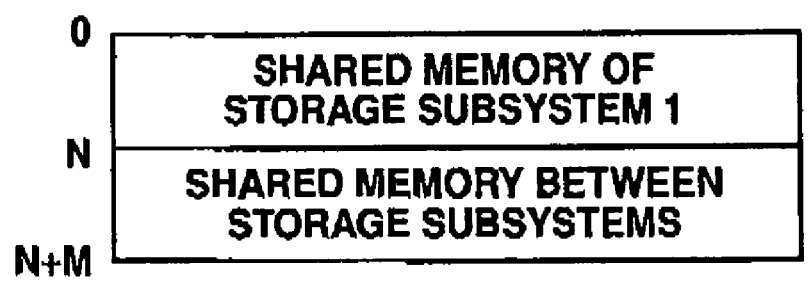
FIG. 15 is a block diagram showing the structure of another memory address in the shared memory of the storage subsystem belonging to the virtual storage system.

As shown with reference numeral 22A of FIG. 1, an independent shared memory may also be connected to the bus connecting wire. If the foregoing management table defined according to the system of the virtual storage system is stored in the shared memory, for example, the CHA 26 and the DKA 23 of the storage subsystem 20A refer to the shared memory 22 of the self-storage subsystem and the shared memory 22A connected to the bus connecting wire. The address of the memory space in the shared memory viewed from the CHA and the DKA will be as shown in FIG. 15.

Figure 16:
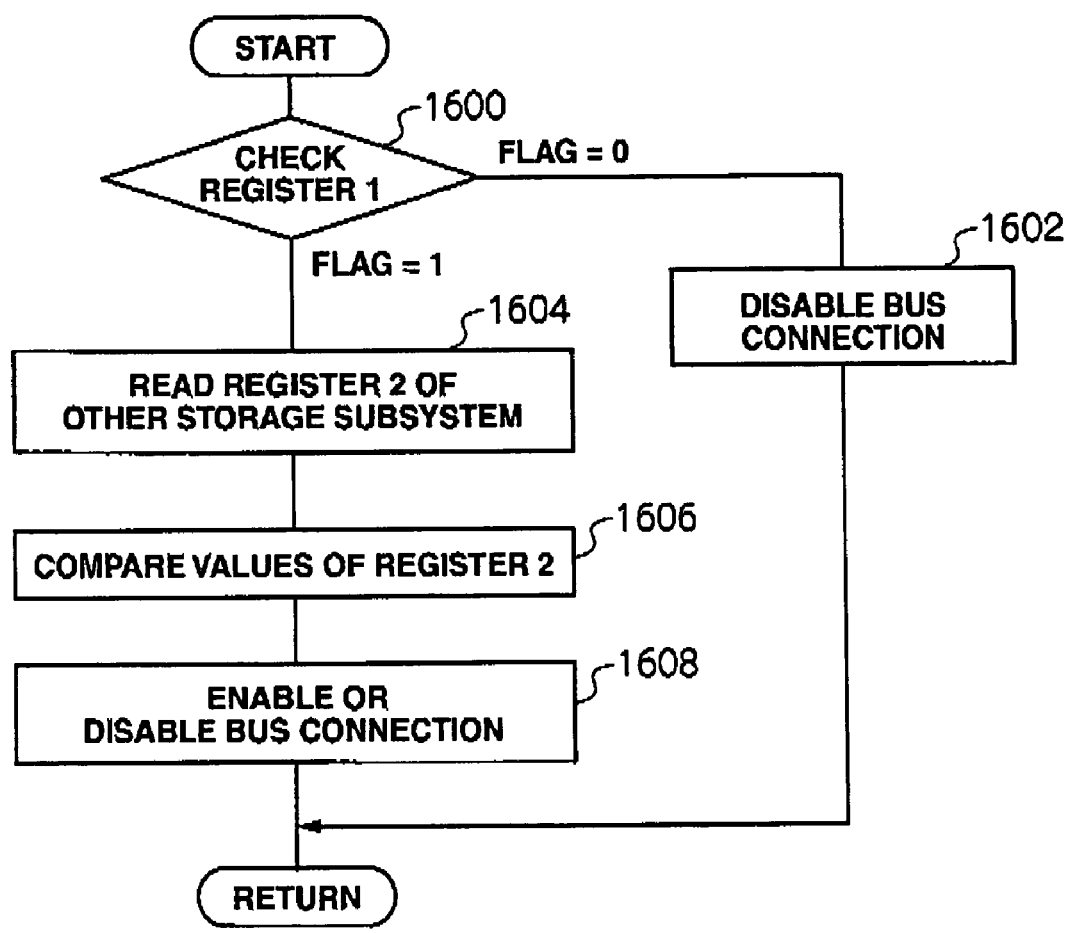
FIG. 16 is a flowchart showing the operation of a bus connector of the respective storage subsystems of the virtual storage system.

FIG. 16 is a flowchart showing the operation of the controller 25A (FIG. 7) of the bus connector 25 of the respective storage subsystems of the virtual storage system. The controller checks the flag of the register 1 (1600) and, upon confirming that the flag "0," disables the bus connection of the bus 100A in the storage subsystem and the bus connecting wire 43, and then ends the flowchart (1602).

If the register of the flag 1 is "1," the controller of the bus connector reads the values of the register 2 of a plurality of other storage subsystems via the bus connecting wire 43 (1604).

Subsequently, the controller reads the value of the register 2 of the bus connector 25 to which it belongs, and compares that value with the values of the respective registers 2 of the plurality of other storage subsystems (1606). The controller enables the bus connection between the bus in the storage subsystem and the bus connecting wire in the storage subsystems in which the foregoing values coincide (1608).

Meanwhile, the controller disables the connection between the internal bus 100A and the bus connecting wire 34 in the storage subsystems in which the foregoing values do not coincide (1608). Thereby, a certain storage subsystem is guaranteed not to be connected to a storage subsystem of another virtual storage system that differs from a virtual storage system to which it belongs.

The routine of the host computer issuing a read command to the storage subsystem belonging to the virtual storage system and the CHA that received the read command processing the read command is now explained.

Figure 17:
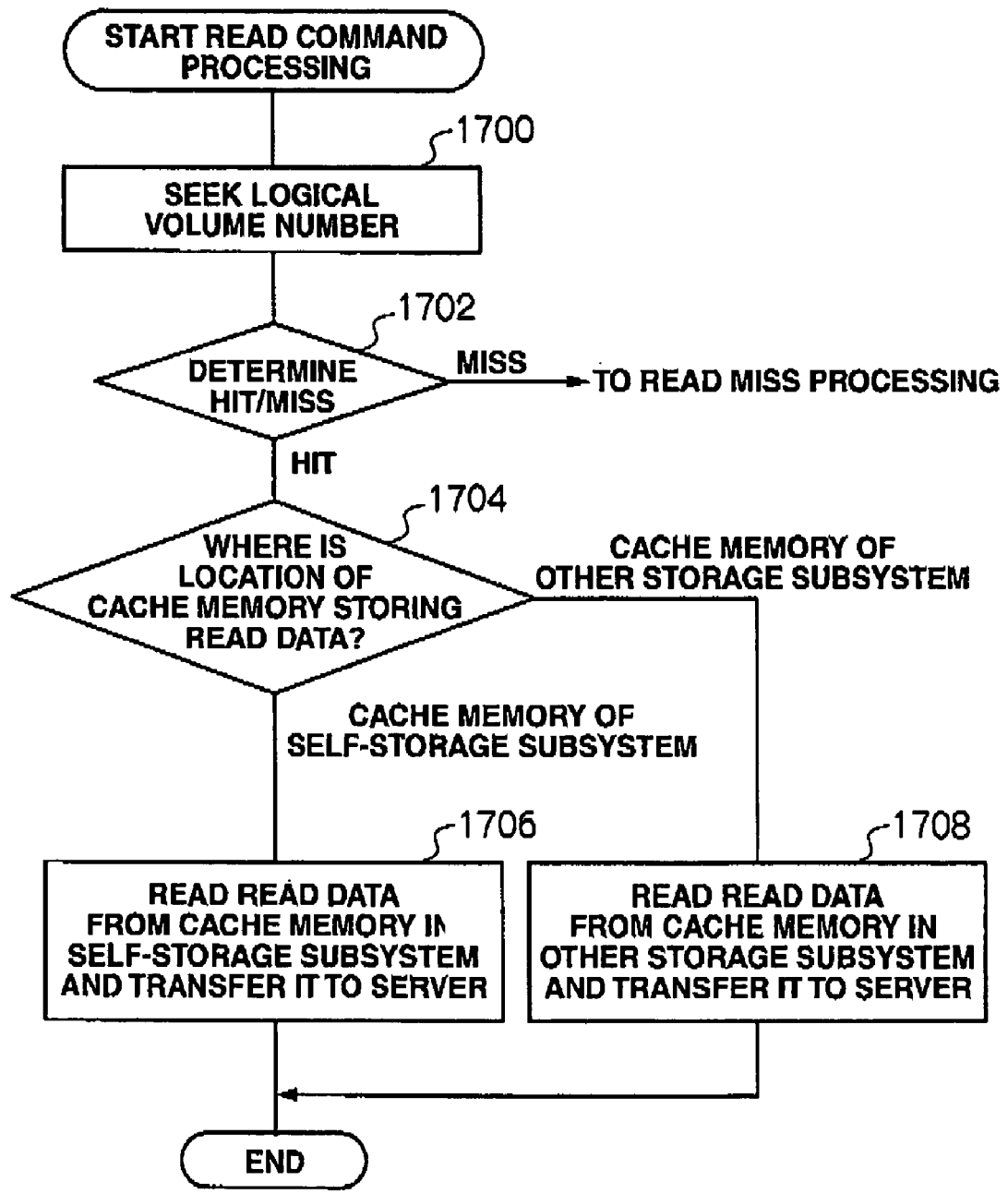
FIG. 17 is a flowchart explaining the outline of the virtual storage system processing a read command.

FIG. 17 is a flowchart explaining this processing. The CHA seeks the logical volume number by referring to the path definition information of the shared memory 22 of the self-storage subsystem from the number of the logical unit designated by the host computer (1700).

Subsequently, the CHA refers to the hit/miss determination table of the shared memory, and checks whether the read data exists in the cache memory 21.

FIG. 18 is a hit/miss determination table that registers the correlation of a block address of the logical volume, a hit/miss flag, an identifier of the storage subsystem storing data, and an address in the cache memory.

If the CHA determines that there is data to be read in the cache memory (hit) as a result of referring to the hit/miss determination table, it determines the location of the cache memory storing the read data (1704). Meanwhile, if the CHA determines that read data does not exist in the cache memory (miss), it proceeds to the read miss processing described later.

If the CHA determines that the data to be read is stored in the cache memory of the self-storage subsystem, it reads the data to be read from the cache memory and transfers it to the server (host computer) (1706).

Meanwhile, if the CHA determines that data to be read exists in another storage subsystem, the CHA 26 accesses the other storage system via the bus connector 25 and the bus connecting wire 43 of the self-storage subsystem, reads the data to be read from the cache memory of the other storage subsystem, and transfers the data to the server that issued the read command (1708).

Figure 19:
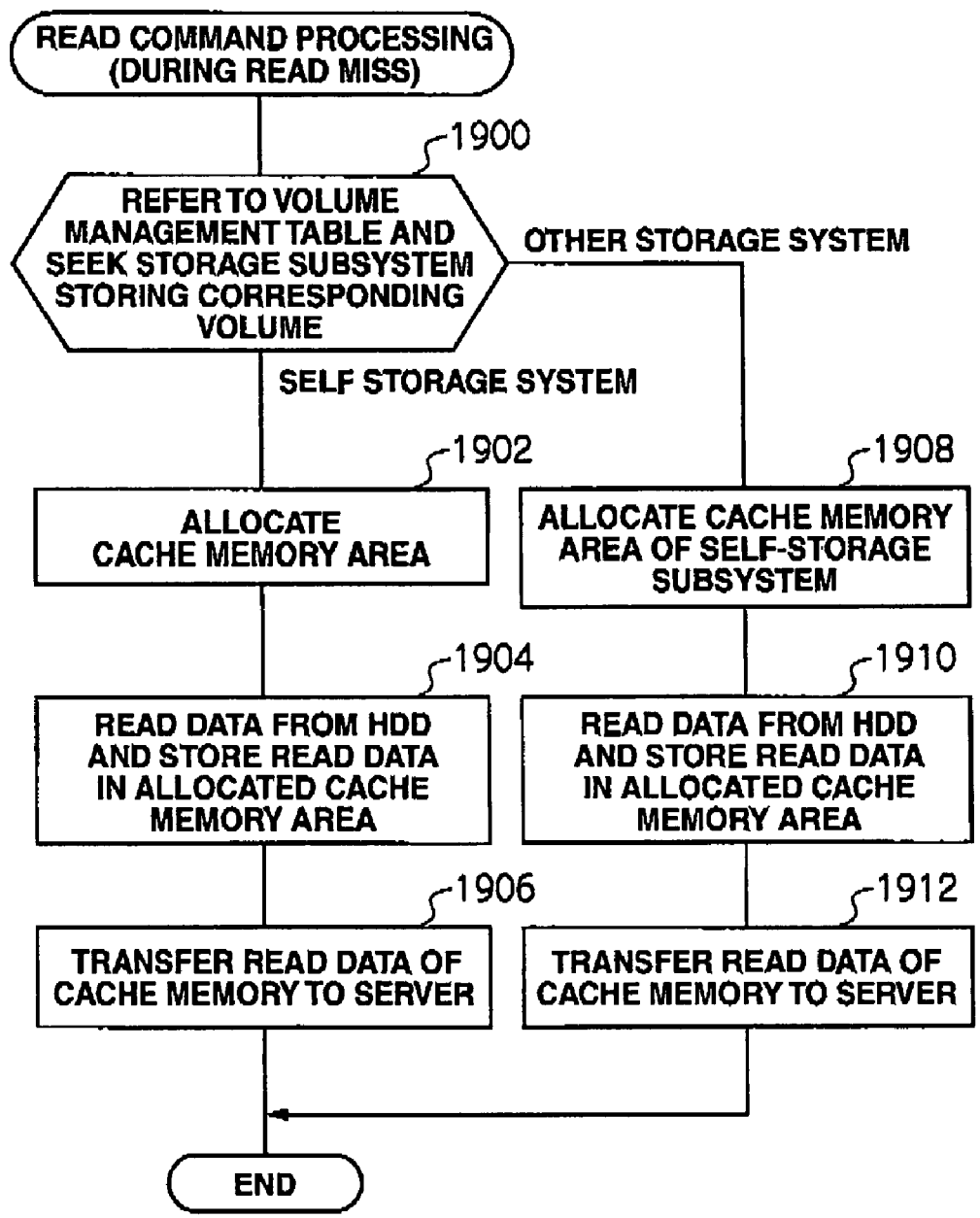
FIG. 19 is a flowchart explaining the outline of the virtual storage system processing a read command during a read miss.

FIG. 19 is a flowchart to be performed subsequently to the read miss determination of FIG. 18. The CHA that received a command from the host computer refers to the volume management table, and determines the storage subsystem including the logical volume storing the read data (1900).

When the CHA determines that the logical volume exists in the storage subsystem that received the command, it allocates the area of the cache memory 21 of the self-storage subsystem to the data to be read (1902).

Subsequently, the DKA reads the data to be read from the disk device, and stores it in the area allocated by the cache memory (1904). The CHA thereafter transfers the data read from the cache memory to the server (1906).

Meanwhile, if the logical volume exists in another storage subsystem, as at step 1902, the CHA allocates the storage area of the cache memory to the data to be read (1908).

Subsequently, the CHA access the other storage subsystem including the intended logical volume via the bus connector 25 and transfers the read command to that shared memory.

The DKA of the other storage subsystem reads the intended data from the disk device, and stores this in the cache memory of the same storage subsystem (1910). The CHA of the storage system that received the read command receives the read data from the cache memory of the other storage subsystem via the bus connector and transfers this to the server.

Figure 20:
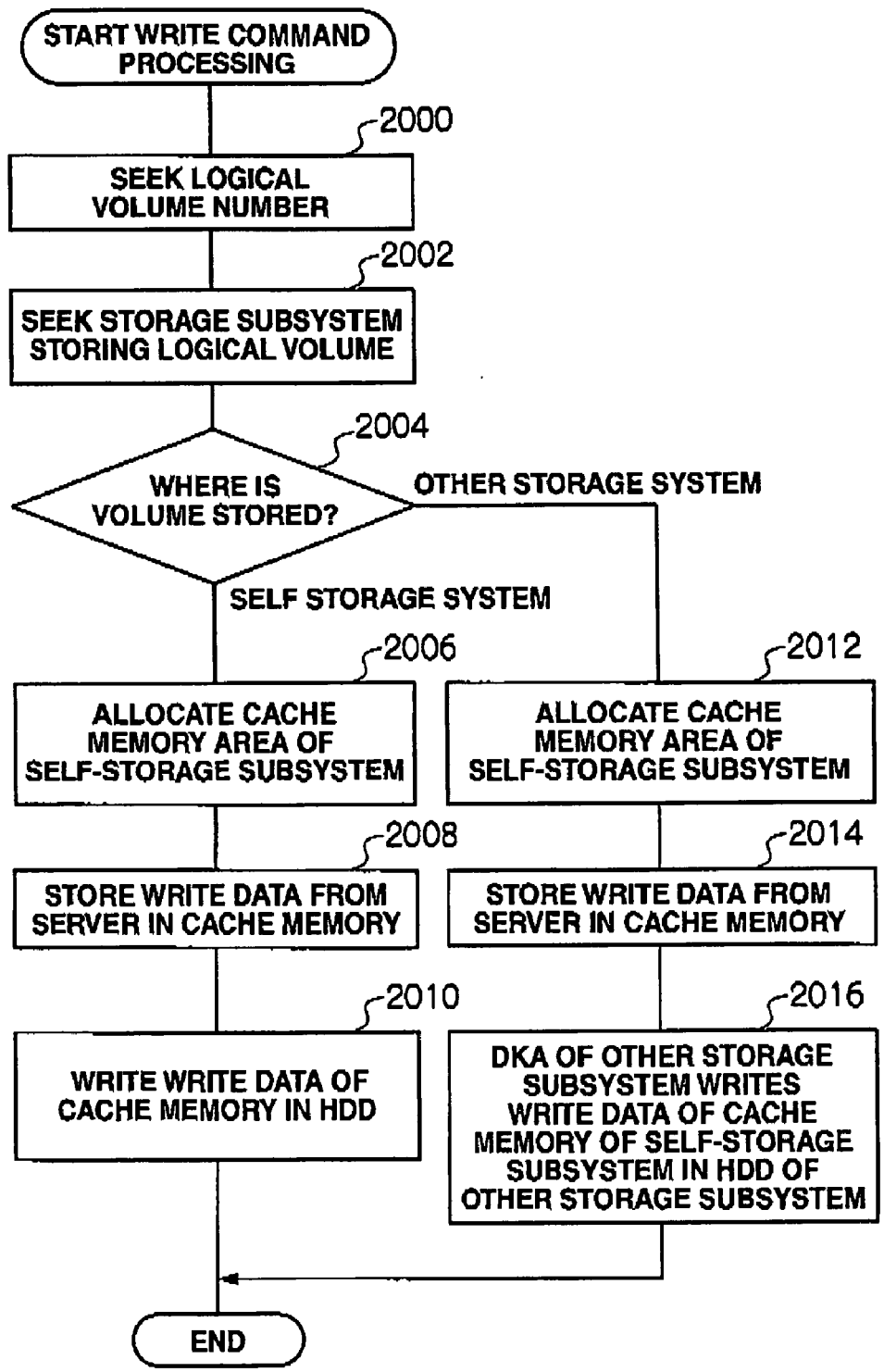
FIG. 20 is a flowchart explaining the outline of the virtual storage system processing a write command.

The processing of the write command is now explained. FIG. 20 is a flowchart explaining this processing. The CHA of the storage subsystem that received a write command from the host computer identifies the logical volume number to which data is to be written from the logical unit number and the path definition information designated by the host computer (2000).

Subsequently, the CHA refers to the volume management table of the shared memory and identifies the storage subsystem including the intended volume (2002).

If the CHA determines that the volume is in the self-storage subsystem as the same storage subsystem as the CHA (2004), the CHA allocates a cache area of the cache memory of the self-storage subsystem to the write data (2006).

Subsequently, the CHA stores the write data from the server in the cache memory (2008). The DKA of the self-storage subsystem reads write data of the cache memory synchronously or asynchronously with the writing of write data into the cache memory, and then stores this in the disk device (2010).

Meanwhile, if the logical volume to which the write data is to be written is in another storage subsystem that is different from the storage subsystem that received the write command (2004), the CHA of the self-storage subsystem allocates the cache area of the cache memory for storing the write data (2012).

The CHA of the self-storage subsystem writes the write data from the server into the allocated area of the cache memory (2014).

The DKA of the other storage subsystem reads the write data from the cache memory of the self-storage subsystem via the bus connector and the bus connecting wire, and that DKA writes the write data into the disk device of its own storage subsystem (2016). This writing, as at step 2010, is performed synchronously or asynchronously with the writing of data into the cache memory.

Figure 21:
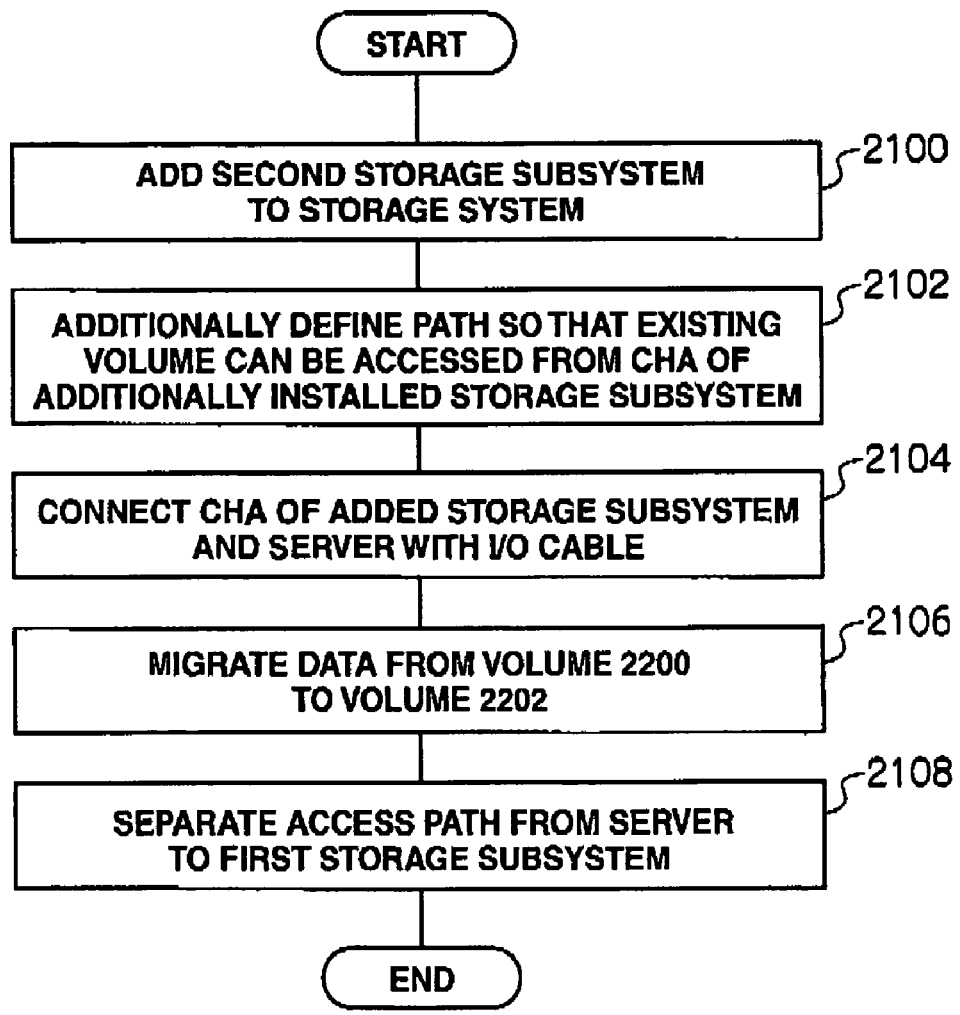
FIG. 21 is a flowchart explaining the migration of data stored in a volume of a first storage [sub]system to a volume of a second storage subsystem between the first storage subsystem and the second storage subsystem configuring the virtual storage system.
Figure 22:
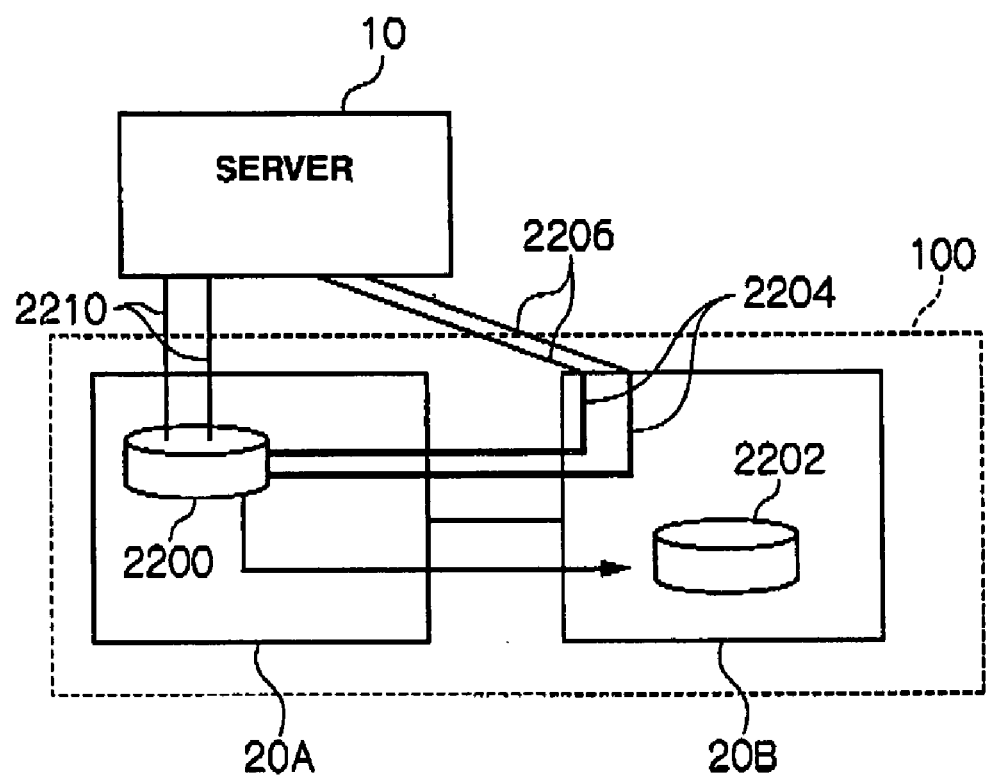
FIG. 22 is a block diagram explaining the process of migration illustrated in FIG. 21.

The first embodiment of the virtual storage system according to the present invention is now explained. FIG. 21 is a flowchart explaining the migration of data stored in a volume of the first storage subsystem to a volume of the second storage subsystem. FIG. 22 is a block diagram showing the migration process.

There is a storage system where the host computer (server) 10 and the first storage subsystem 10A (FIG. 22) are connected. A second storage subsystem 10B is added to this storage system (2100). For example, this would be a case where the first storage subsystem 10A is replaced or updated with the second storage subsystem 10B.

The master management apparatus sets the virtual operation mode to the first and second storage subsystems as described above, and the first storage subsystem and the second storage subsystem configure the virtual storage system 100 by storing the virtualization ID and the virtual information.

Subsequently, the management apparatus or the master management apparatus of the second storage subsystem 20B defines a path 2204 enabling access to the logical volume 2200 of the first storage subsystem 10A so that the volume of the first storage subsystem 20A can be accessed from the CHA of the second storage subsystem 10B added to the storage system (2102).

Subsequently, when the CHA port of the second storage subsystem 10B and the I/O cable 2206 of the host computer 10 are connected (2104), the host computer recognizes that the access path to the logical volume 2200 has been added.

The master management apparatus sets the logical volume 2200 of the first storage subsystem as the migration source, sets the logical volume 2202 of the second storage subsystem as the migration destination, and the CHA of the first storage subsystem migrates the data of the migration source logical volume to the migration destination (2106). During this process, access from the server 10 to the logical volume 2200 is continued.

When the data migration from the logical volume 2200 of the first storage subsystem to the logical volume 2202 of the second storage subsystem is complete, the access path 2210 between the host computer and the first storage subsystem is disconnected (2108).

The host computer will recognize this as the existing path 2210 being removed after a path (2206→2204) to the logical volume 2200 has been newly added.

Figure 23:
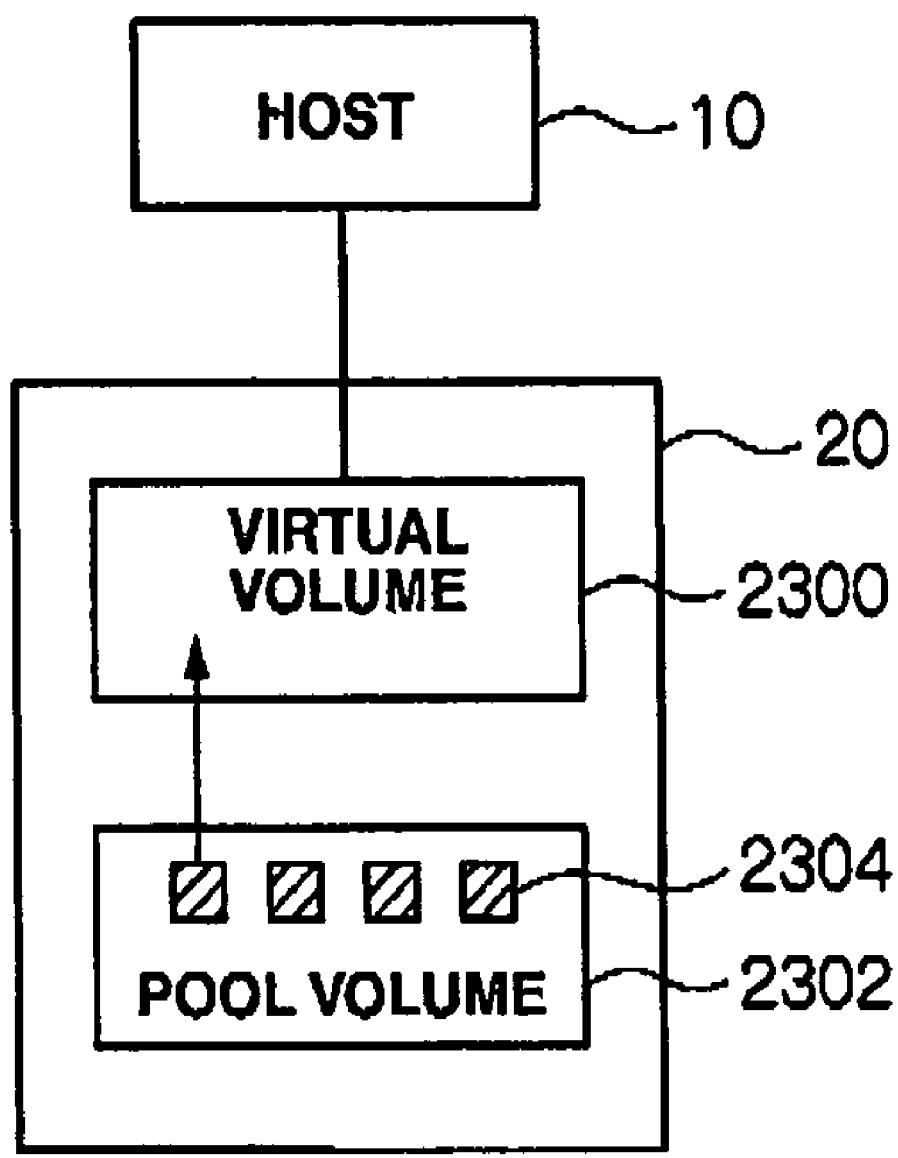
FIG. 23 is a block diagram explaining the principle of dynamic provisioning.

The second embodiment of the present invention is now explained. This embodiment relates to dynamic provisioning as referred to by Applicant. As shown in FIG. 23, the storage subsystem 20 comprises a virtual volume 2300 recognized by the host computer.

The virtual volume 2300 is merely showing a virtual capacity to the host computer 10, and an actual storage area of a disk device is not allocated to itself.

When data is written from the host computer into the virtual volume, the unit volume 2304 of the storage area is allocated to the writing of data from the host computer from the pool volume 2302 that is pooling the storage area of the disk device. The foregoing function is referred to as dynamic provisioning.

Figure 24:
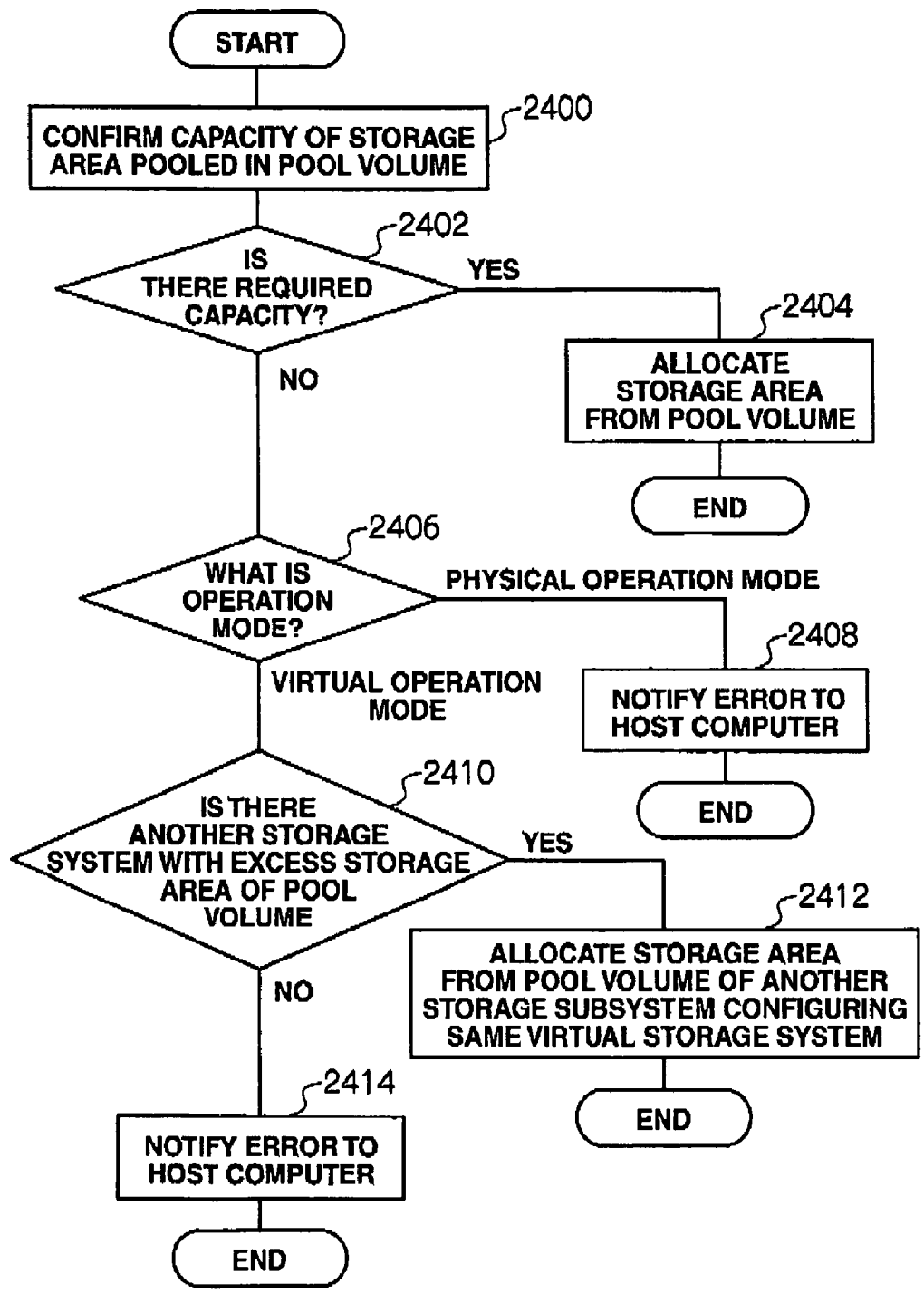
FIG. 24 is a flowchart explaining the operation of dynamic provisioning.

FIG. 24 is a flowchart explaining the operation of dynamic provisioning. When there is write access from the host computer to the virtual volume of the first storage subsystem, this flowchart is started, and the CHA of the first storage subsystem confirms the capacity of the storage area pooled to the pool volume (2400).

The CHA determines whether there is necessary capacity for the write access from the host computer (2402). Upon obtaining a positive result in this determination, the CHA allocates the storage area to the write access from the host computer, and the DKA stores the write data in this storage area (2404).

Meanwhile, if there is no storage area or insufficient storage area in the pool volume, the CHA checks the operation mode flag stored in the shared memory (2406).

When the CHA determines that the operation mode is a physical operation mode, the CHA notifies the host computer that issued the write command that the capacity of the pool volume is insufficient and the storage area cannot be allocated to the write access (2408).

Meanwhile, if the CHA determines that the operation mode is a virtual operation mode, it refers to the management table shown in FIG. 25 of the shared memory. This management table is for managing the capacity of the pool volume of the respective storage subsystems belonging to the virtual storage system, and the CHA refers to this management table and determines if there are other storage subsystems having excess pool volumes (2408).

If the CHA determines that none of the storage subsystems has excess pool volumes, the CHA notifies the host computer that issued the write command that the capacity of the pool volume is insufficient and the storage area cannot be allocated to the write access (2410).

If the CHA detects another storage subsystem having an excess pool volume, the CHA transfer write data to such storage subsystem, and the DKA of the other storage subsystem to which the write data was transferred allocates the storage area of the disk device for storing the write data (2412).

Figure 26:
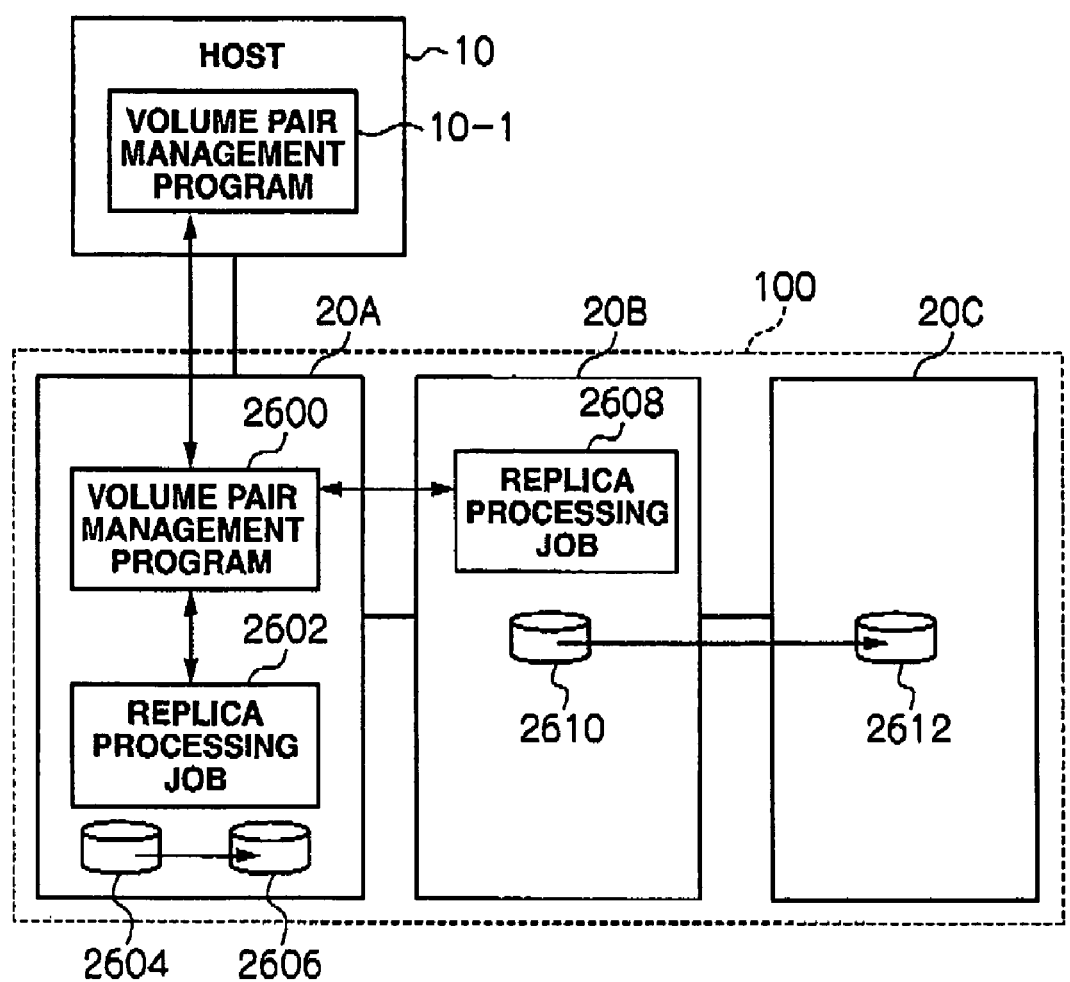
FIG. 26 is a block diagram explaining a replica processing job of the virtual storage system.

FIG. 26 shows the third embodiment of the virtual storage system 100 according to the present invention where the host computer 10 is connected to the first storage subsystem 20A. The first storage subsystem 20A, the second storage subsystem 20B, and the third storage subsystem 20C configure the virtual storage system 100.

The host computer 10 and the first storage subsystem 20A configure a volume pair management program (10-1, 2600). The volume pair management program 2600 of the first storage subsystem executes the replica processing job 2602 and creates a replica 2606 of the logical volume 2604.

The CHA of the second storage subsystem 20B accesses the volume management program 2600 of the first storage subsystem 20A and executes the replica processing job 2608. The second storage subsystem creates a replica 2612 of the logical volume 2610 in the third storage subsystem.

When viewed from the host computer, since the first storage subsystem, the second storage subsystem, and the third storage subsystem are recognized logically as one storage subsystem, the creation of a replica of a volume of the second storage subsystem in a logical volume of the third storage subsystem can be processed as the creation of a volume pair in the same storage subsystem.

Figure 27:
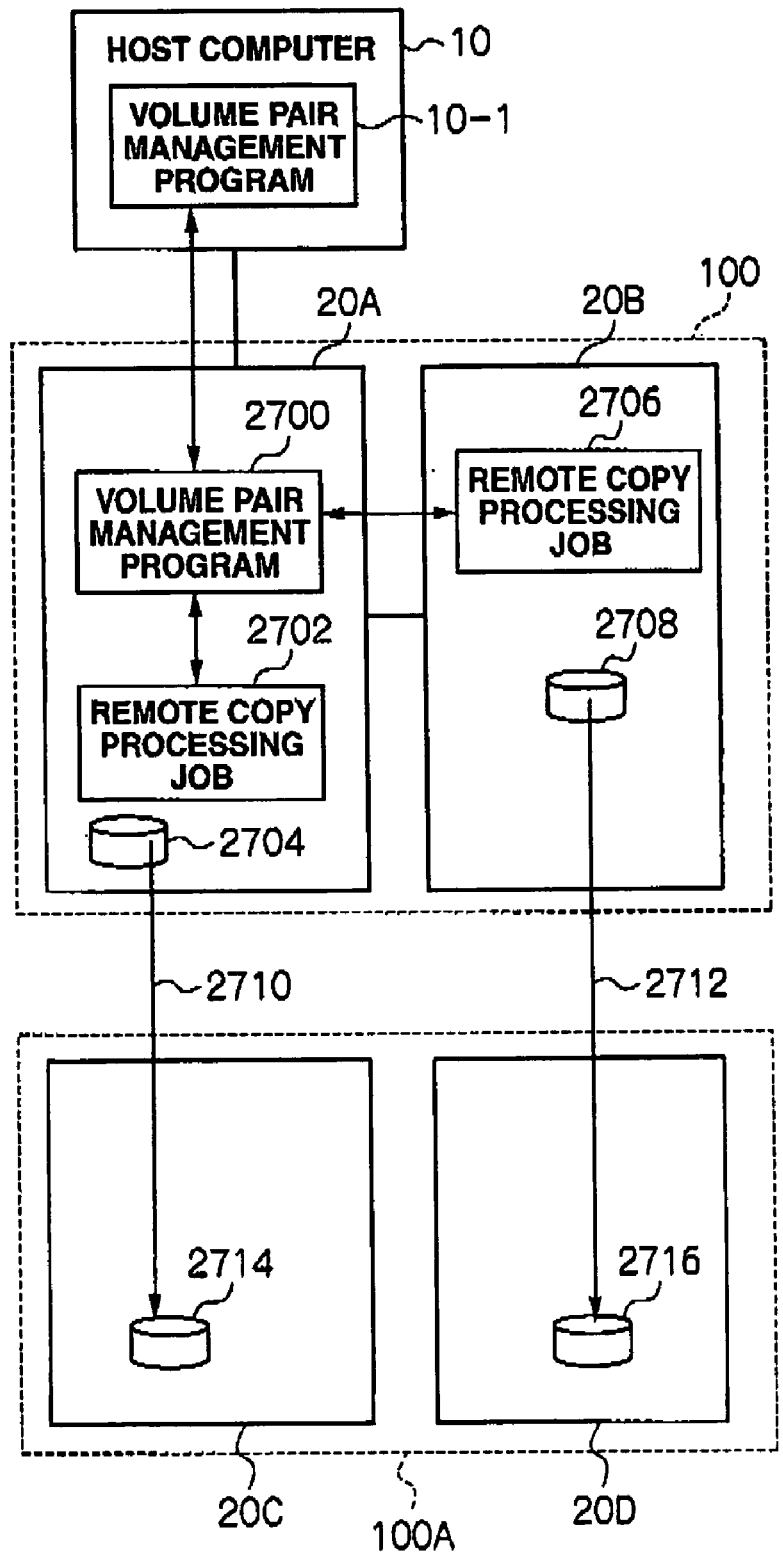
FIG. 27 is a block diagram explaining a remote copy processing job of the virtual storage system.

FIG. 27 shows the fourth embodiment of the present invention, and the storage system comprises two virtual storage systems 100, 100A. The first storage subsystem 20A and the second storage subsystem 20B configure the first virtual storage system 100, and the third storage subsystem 20C and the fourth storage subsystem 20D configure the second virtual storage system 100A.

A first virtualization ID is set to the first storage subsystem and the second storage subsystem. A second virtualization ID, which is different from the first virtualization ID, is set in the third storage subsystem and the fourth storage subsystem.

The volume pair management program 2700 of the first storage subsystem executes the remote processing job 2702, configures the first logical volume 2704 and the third logical volume 2714 of the third storage subsystem as a remote copy pair, and remote copies 2710 the data, which is sent from the host computer to the first logical volume 2704, to the third logical volume 2714.

The second storage subsystem executes the remote processing job 2706 based on the volume pair management program 2706, configures the second logical volume 2708 and the fourth logical volume 2716 of the fourth storage subsystem as a remote copy pair, and remote copies 2712 the write data, which is sent from the host computer 10 to the second logical volume, to the fourth logical volume 2716.

Figure 28:
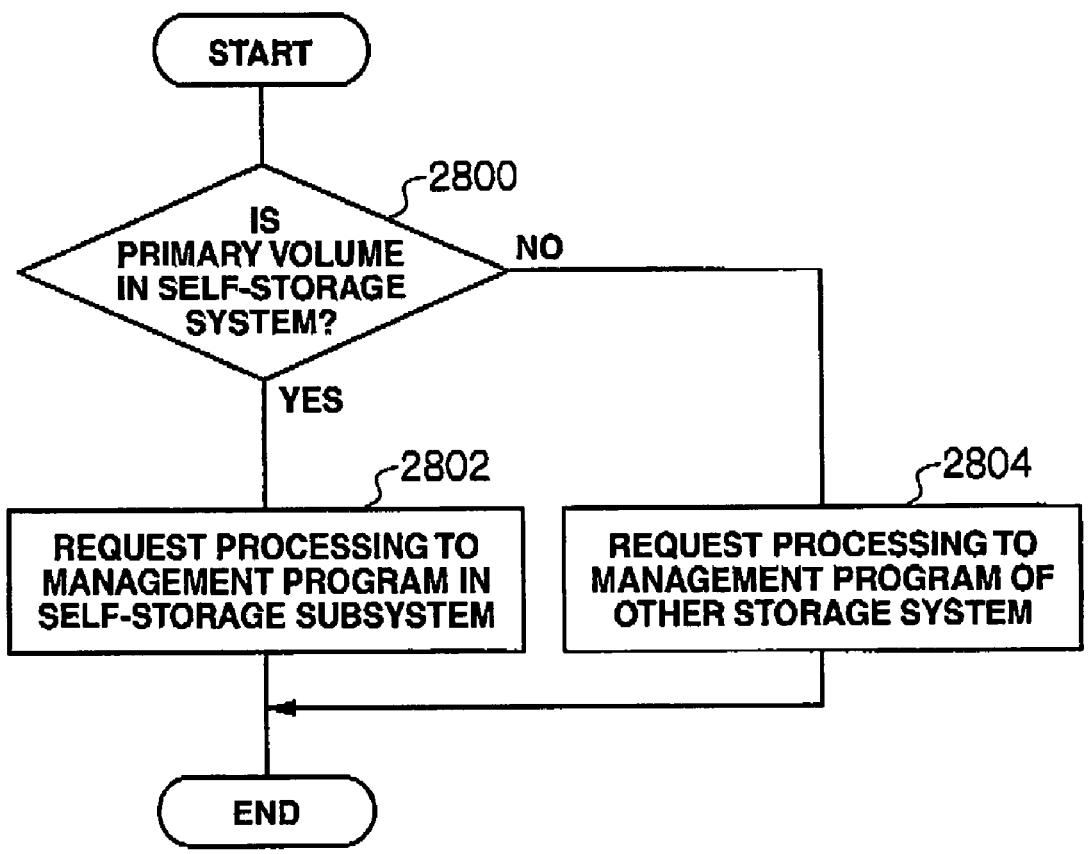
FIG. 28 is a block diagram explaining the volume copy processing of the virtual storage system.

FIG. 28 is a flowchart showing the processing to be performed by the CHA of the first storage subsystem that received a control command relating to the volume pair from the host computer in the third and fourth embodiments. When the CHA receives a logical volume pair management command from the host computer, it determines whether the pair volume as a copy source among the volume pairs is located in the self-storage subsystem (2800).

If the CHA determines that the pair volume is located in the self-storage subsystem, the CHA requests the volume pair management program of the self-storage subsystem to perform replica processing and remote copy processing (2802).

Meanwhile, if the CHA determines that the pair volume is located in another storage subsystem, the CHA of the self-storage subsystem transfers the pair management command from the host computer to the volume pair management program of the other storage subsystem storing the pair volume, and requests the execution of jobs relating to the volume pair (2804).

Figure 29:
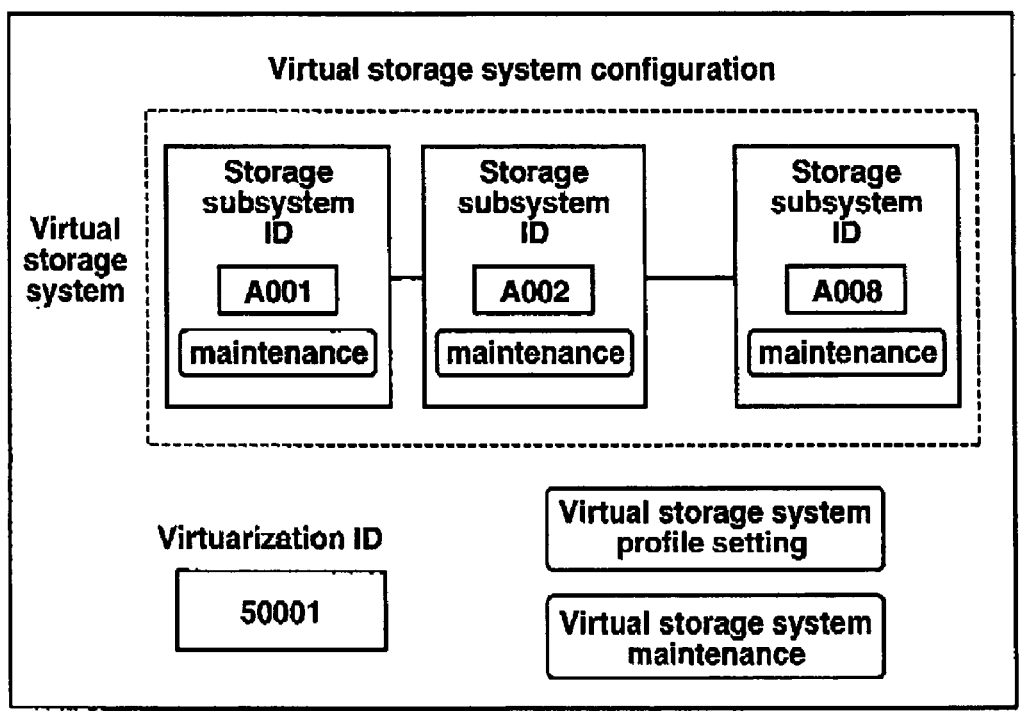
FIG. 29 is a management screen of the integrated management apparatus showing configuration information of the virtual storage system.

With the virtual storage system described above, the master management apparatus comprehensively manages the virtual storage system. FIG. 29 shows the configuration information of the virtual storage system to be provided from the master management apparatus to the user administrator.

FIG. 29 shows that the storage subsystem (A001), the storage subsystem (A002), and the storage subsystem (A003) are integrated to configure the virtual storage system. The ID of the virtual storage system is 50001, and the setting function of the profile of the virtual storage system and the maintenance function of the virtual storage system are presented to the user administrator.

Figure 30:
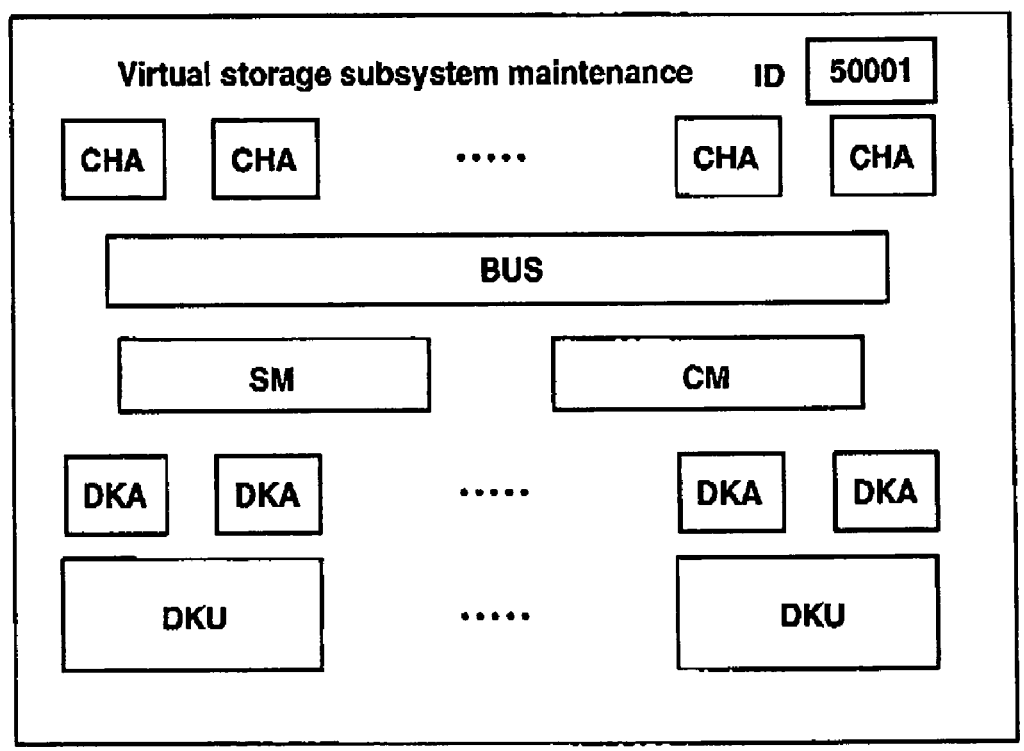
FIG. 30 is a management screen of the integrated management apparatus showing information concerning maintenance of the virtual storage system.
Figure 31:
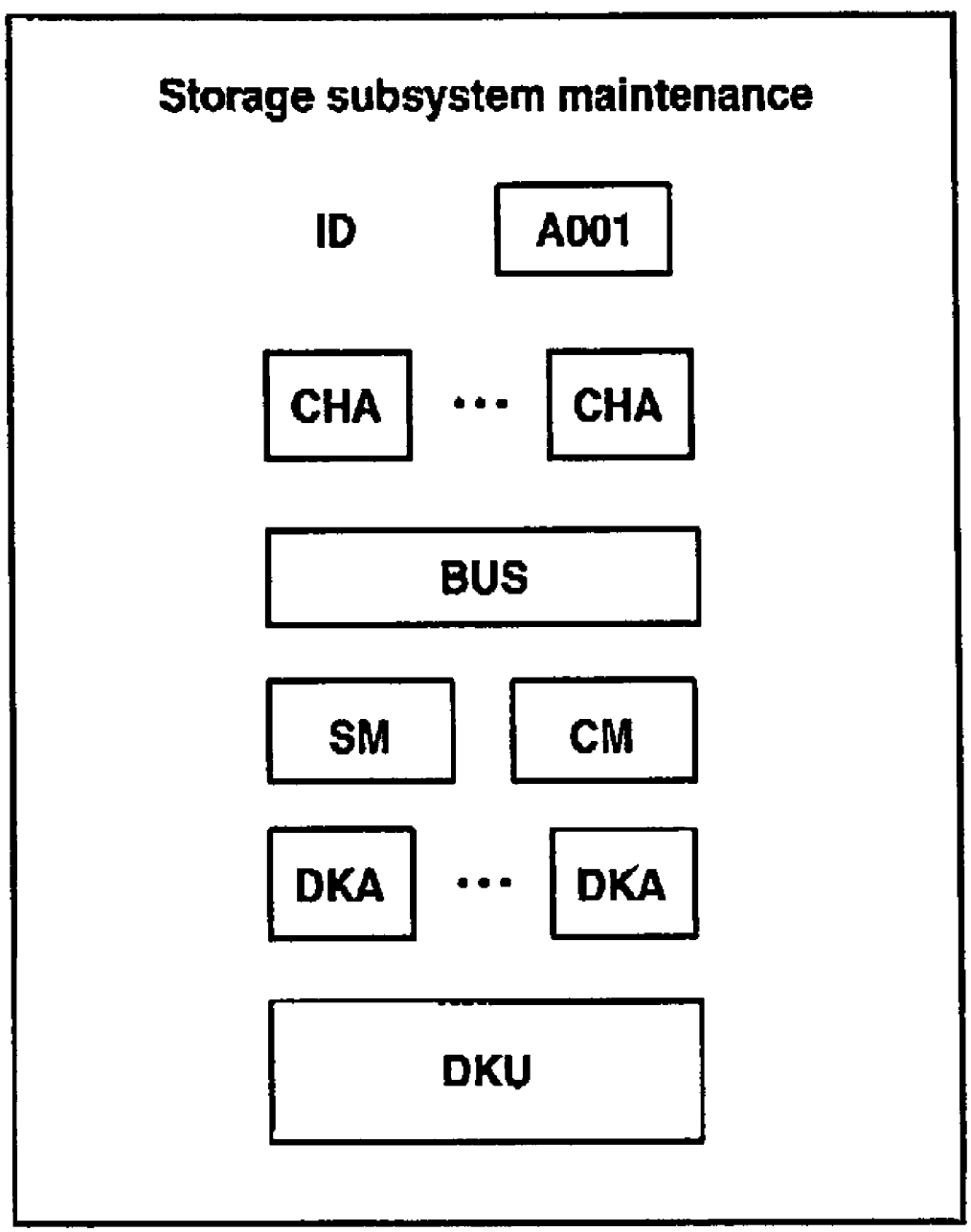
FIG. 31 is a management screen of the integrated management apparatus or the individual management apparatuses showing maintenance information of the storage subsystem belonging to the virtual storage system.

When the user administrator selects the maintenance function of the virtual storage system, the maintenance screen of FIG. 30 is presented to the user administrator. An abnormal unit is notified to the user administrator by flashing or the like.

When the user administrator selects the maintenance function of the storage subsystem, the maintenance screen of the selected storage subsystem is notified to the user administrator.

With the embodiments and examples of the present invention described above, as a result of a plurality of storage subsystems operating in the same virtualization mode mutually unifying the reply command to the host computer, the host computer recognized such plurality of storage subsystems logically as one storage subsystem. Nevertheless, the host computer is also able to recognize the plurality of storage subsystems logically as one storage resource by loading the host computer with a virtualization program, or the host computer is able to recognize the plurality of storage subsystems logically as one storage resource by providing a virtualization apparatus between the host computer and the storage subsystem.

The present invention is also able to operate the storage subsystem in a virtualization mode in relation to a certain host system, and operate it in a physical operation mode in relation to another host system.

FIG. 32 is a block diagram showing this kind of storage system. FIG. 32 shows that the storage subsystem is operated in the physical operation mode in relation to the server 1 and in the virtualization mode in relation to the server 2 by partitioning the storage resources and control resources of the storage subsystem 1.

What is claimed is:

1. A storage system comprising a plurality of storage subsystems, wherein each storage subsystem includes a storage resource and controls access from a host system to the storage resource of the storage subsystem, the storage system comprising:

a controller configured to virtualize the plurality of storage subsystems logically into one virtual storage subsystem and execute a first mode of causing the host system to recognize the virtual storage subsystem execute a second mode of causing the host system to recognize the plurality of storage subsystems respectively as separate storage subsystems; and a memory for recording configuration information for setting the first mode or the second mode;

wherein, when the first mode is set in the memory, the controller executes the first mode;

wherein, when the second mode is set in the memory, the controller executes the second mode, wherein each of the plurality of storage subsystems comprises the controller and the memory, wherein respective memories of the plurality of storage subsystems subject to the first mode record common information, wherein the common information includes an ID that is common to the plurality of storage subsystems subject to the first mode, wherein each of the plurality of storage subsystems subject to the first mode includes a connector for connecting each other; and wherein the connector disables the connection between the plurality of storage subsystems having a different ID.

2. The storage system according to claim 1, wherein the common information is profile information that is common to the plurality of storage subsystems subject to the first mode.

3. The storage system according to claim 1, the host computer receives the common information from the memory of the plurality of storage subsystems subject to the first mode and recognizes the plurality of storage subsystems logically as one storage subsystem.

4. The storage system according to claim 1, wherein the common information is supplied from an integrated management apparatus common to the plurality of storage subsystems subject to the first mode to the memory.

5. A storage system comprising a plurality of storage subsystems, wherein each storage subsystem includes a storage resource and controls access from a host system to the storage resource of the storage subsystem, the storage system comprising:

a controller configured to virtualize the plurality of storage subsystems logically into one virtual storage subsystem and execute a first mode of causing the host system to recognize the virtual storage subsystem, the execute a second mode of causing the host system to recognize the plurality of storage subsystems respectively as separate storage subsystems; and a memory for recording configuration information for setting the first mode or the second mode;

wherein, when the first mode is set in the memory, the controller executes the first mode; and wherein, when the second mode is set in the memory, the controller executes the second mode, wherein each of the plurality of storage subsystems subject to the first mode includes a connector for connecting each other;

wherein, when the memory records the first mode, the first controller releases the connector; and wherein, when the memory records the second mode, the controller blocks the connector.

* * * * *